United States Patent
Kato

(10) Patent No.: US 8,582,953 B2
(45) Date of Patent: Nov. 12, 2013

(54) INFORMATION PROCESSING DEVICE, INFORMATION PROCESSING METHOD, PLAYING DEVICE, PLAYING METHOD, AND PROGRAM

(75) Inventor: Motoki Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 12/995,305

(22) PCT Filed: Apr. 2, 2010

(86) PCT No.: PCT/JP2010/056078
§ 371 (c)(1),
(2), (4) Date: Nov. 30, 2010

(87) PCT Pub. No.: WO2010/116955
PCT Pub. Date: Oct. 14, 2010

(65) Prior Publication Data
US 2011/0116762 A1    May 19, 2011

(30) Foreign Application Priority Data

Apr. 7, 2009   (JP) .................................. 2009-093159
Mar. 19, 2010  (JP) .................................. 2010-065109

(51) Int. Cl.
*H04N 9/80* (2006.01)
*H04N 5/93* (2006.01)

(52) U.S. Cl.
USPC ........................................................ 386/241

(58) Field of Classification Search
USPC ............... 386/241, 357, 248, E9.011, E5.028
See application file for complete search history.

(56) References Cited

U.S. PATENT DOCUMENTS

| 6,925,250 B1* | 8/2005 | Oshima et al. ................. 386/329 |
| 2004/0008739 A1* | 1/2004 | Aoki ............................. 370/537 |
| 2005/0123279 A1* | 6/2005 | Takakuwa et al. .............. 386/95 |
| 2011/0038614 A1* | 2/2011 | Chen et al. ..................... 386/341 |

FOREIGN PATENT DOCUMENTS

| EP | 0 888 018 A1 | 12/1998 |
| EP | 1 011 268 A1 | 6/2000 |
| EP | 1 094 674 A2 | 4/2001 |
| JP | 11-191815 | 7/1999 |
| JP | 11 191895 | 7/1999 |

(Continued)

OTHER PUBLICATIONS

International Search Report issued Jun. 22, 2010 in PCT/JP10/056078 filed Apr. 2, 2010.

(Continued)

*Primary Examiner* — Thai Tran
*Assistant Examiner* — Nien-Ru Yang
(74) *Attorney, Agent, or Firm* — Oblon, Spivak, McClelland, Maier & Neustadt, L.L.P.

(57) ABSTRACT

The present invention relating to an information processing device, information processing method, playing device, playing method, and program that enables playing of stereo image (3D image) contents appropriately.
In the case that 3D playing using Base view video and D1 view video is instructed, "10000.ilvt (ref_to_D1-B_interleaved_file_name) described in interleaved_file_info ( ) of the PlayList file is specified, and Base view video chunks and D1 view video chunks are read out from an optical disc through a UDF file system. The Base view video chunks and D1 view video chunks that are read out are supplied to a decoder unit and played. The present invention is applicable to a playing device compatible with the BD-ROM standard.

6 Claims, 44 Drawing Sheets

(56) References Cited

FOREIGN PATENT DOCUMENTS

| WO | 2009 133714 | 11/2009 |
|---|---|---|
| WO | WO 2010/095411 A1 | 8/2010 |
| WO | WO 2010/098134 A1 | 9/2010 |

OTHER PUBLICATIONS

Office Action issued Mar. 1, 2012, in Japanese Patent Application No. 2010-065109.

Office Action issued Mar. 1, 2012, in Japanese Patent Application No. 2012-029502.

Ying Chen, et al. "The Emerging MVC Standard for 3D Video Services"; EURASIP Journal on Advances in Signal Processing; vol. 2009; Mar. 25, 2008; XP002634721; ISSN: 1687-6172, 14 pgs.

European Search Report issued Jun. 5, 2013, in European Patent Application No. 10761654.2-1905/2288172 PCT/JP2010056078.

* cited by examiner

FIG. 11

| Syntax | No. of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++){ | | |
|         padding_word | 16 | bslbf |
|     } | | |
|     PlayList() | | |
|     for(i=0; i<N2; i++){ | | |
|         padding_word | 16 | bslbf |
|     } | | |
|     PlayListMark() | | |
|     for(i=0; i<N3; i++){ | | |
|         padding_word | 16 | bslbf |
|     } | | |
|     ExtensionData() | | |
|     for(i=0; i<N4; i++){ | | |
|         padding_word | 16 | bslbf |
|     } | | |
| } | | |

FIG. 12

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 13

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for(i=0;i< number_of_SubPlayItems;i++) { | | |
|     SubPlayItem(i) | | |
|   } | | |
| } | | |

FIG. 14

SubPlayItem(i)-Syntax

| Syntax | No. of bits | Mnemonic |
|---|---|---|
| SubPlayItem(i) { | | |
| length | 16 | uimsbf |
| Clip_Information_file_name[0]  //subclip_entry_id=0 | 8*5 | bslbf |
| Clip_codec_identifier[0] | 8*4 | bslbf |
| reserved_for_future_use | 31 | bslbf |
| is_multi_Clip_entries | 1 | bslbf |
| ref_to_STC_id[0] | 8 | uimsbf |
| SubPlayItem_IN_time | 32 | uimsbf |
| SubPlayItem_OUT_time | 32 | uimsbf |
| sync_PlayItem_id | 16 | uimsbf |
| sync_start_PTS_of_PlayItem | 32 | uimsbf |
| if(is_multi_Clip_entries==1b) { | | |
| reserved_for_future_use | 8 | bslbf |
| num_of_Clip_entries | 8 | uimsbf |
| for (subclip_entry_id=1;//Note:Entries after subclip_entry_id=0 | | |
| subclip_entry_id<num_of_Clip_entries;subclip_entry_id ++) { | | |
| Clip_Information_file_name[subclip_entry_id] | 8*5 | bslbf |
| Clip_codec_identifier[subclip_entry_id] | 8*4 | bslbf |
| ref_to_STC_id[subclip_entry_id] | 8 | uimsbf |
| reserved_for_future_use | 8 | bslbf |
| } | | |
| } | | |
| } | | |

FIG. 15

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     } else { | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 16

| STN_table() | | |
|---|---|---|
| Syntax | No. of bits | Mnemonic |
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_textST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 17

```
1:  3D_PlayList {
2:    number_of_PlayItems
3:    for (i=0; i<number_of_PlayItems; i++) {
4:      PlayItem() {
5:        ref_to_B_clpi_file_name // FIVE-DIGIT digit EXCLUDING EXTENSION OF m2ts file INCLUDING Base-view (B-view) video
6:        type
7:        STN_table()
8:      }
9:    number_of_SubPaths
10:   for (i=0; i<number_of_SubPaths; i++) {
11:     SubPath()[i] {
12:       SubPath_type
13:       ref_to_clpi_file_name
14:     }
15:   }
16:   interleaved_file_info() {
17:     if (type== "D1-D2-B are interleaved" ) {
18:       ref_to_D1-B_interleaved_file_name
19:       ref_to_D2-B_interleaved_file_name
20:       ref_to_D1_clpi_file_name
21:       ref_to_D2_clpi_file_name
22:     }
23:     else if (type== "D1-B are interleaved" ) {
24:       ref_to_D1-B_interleaved_file_name
25:       ref_to_D1_clpi_file_name
26:     }
27:     else (type== "D2-B are interleaved" ) {
28:       ref_to_D2-B_interleaved_file_name
29:       ref_to_D2_clpi_file_name
30:     }
31:   }
32: }
```

FIG. 18

| type | Meaning |
|---|---|
| 0 | Not interleaved. A single m2ts that includes B-view and may includes D1 view and/or D2 view |
| 1 | D1-D2-B are interleaved. |
| 2 | D1-B are interleaved. |
| 3 | D2-B are interleaved. |

FIG. 19

SubPath_type

| SubPath_type | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItems in the PlayList.) |
| 3 | Out-of-mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the SubPath is synchronized with the main path using PlayItems in the PlayList.) |
| 5 | Out-of-mux and AV synchronized type of one or more elementary streams path<br>(Primary audio/PG/IG/Secondary audio path.)<br><br>Out-of-mux and AV synchronized type of Picture-in-Picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8 | SUB-PATH TO PLAY D1-view video |
| 9 | SUB-PATH TO PLAY D2-view video |
| 10-255 | reserved |

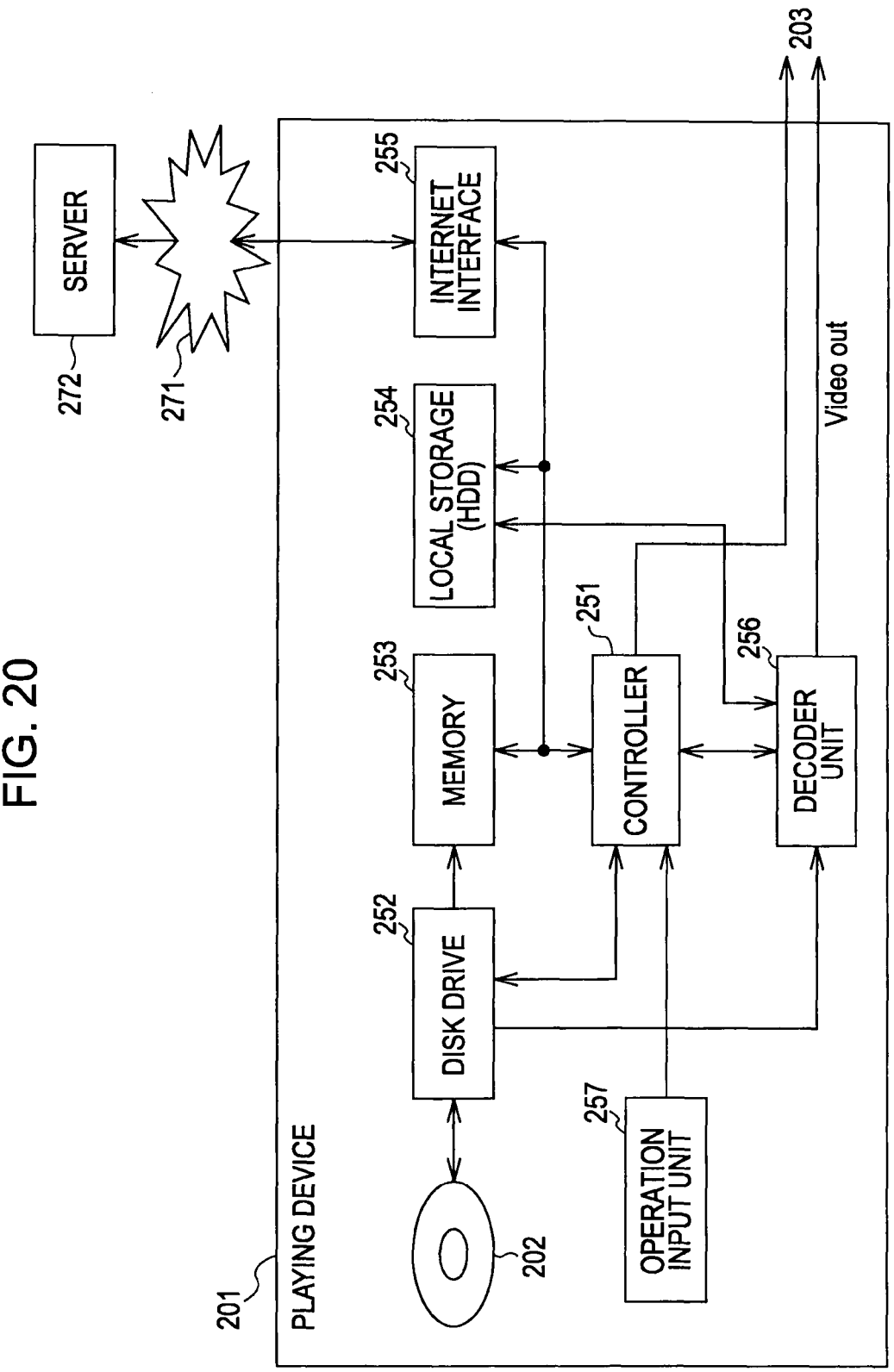

FIG. 22

3D_PlayList

```
00000.mpls{
  PlayItem() {
    "00001"; // 00001.clpi (ref_to_B_clpi_file_name)
    type = "D1-D2-B are interleaved";
    STN_table()
  }
  SubPath() [1] {
    SubPath_type=9: "00002"; // ref to 00002.clpi
  }
  SubPath() [2] {
    SubPath_type=8: "00003"; // ref to 00003.clpi
  }
  interleaved_file_info() {
    10000; // 10000.ilvt (ref_to_D1-B_interleaved_file_name)
    20000; // 20000.ilvt (ref_to_D2-B_interleaved_file_name)
    00003; // 00003.clpi (ref_to_D1_clpi_file_name)
    00002; // 00002.clpi (ref_to_D2_clpi_file_name)
  }
}
```

FIG. 23

A
```
00001.clpi {
  number_of_source_packets1
  EP_map
  chunk_map()
}
```

B
```
00002.clpi {
  number_of_source_packets2
  EP_map
  chunk_map()
}
```

C
```
00003.clpi {
  number_of_source_packets3
  EP_map
  chunk_map()
}
```

FIG. 26

```
chunk_map() {
    number_of_chunks
    for (i=0; i<number_of_chunks; i++) {
        SPN_chunk_start[i]
    }
}
```

FIG. 27

A
```
00001.clpi {
  number_of_source_packets1
  EP_map
  chunk_map() {
    n+1,
    0, c1, c2, ⋯, cn
  }
}
```

B
```
00002.clpi {
  number_of_source_packets2
  EP_map
  chunk_map() {
    n+1,
    0, b1, b2, ⋯, bn
  }
}
```

C
```
00003.clpi {
  number_of_source_packets3
  EP_map
  chunk_map() {
    n+1,
    0, a1, a2, ⋯, an
  }
}
```

FIG. 29

3D_PlayList

```
00000.mpls{
  PlayItem() {
    "00001"; // 00001.clpi (ref_to_B_clpi_file_name)
    type = "D2-B are interleaved";
    STN_table()
  }
  SubPath() {
    SubPath_type=9; "00002"; // ref to 00002.clpi
  }
  interleaved_file_info() {
    20000; // 20000.ilvt (ref_to_D2-B_interleaved_file_name)
    00002; // 00002.clpi (ref_to_D2_clpi_file_name)
  }
}
```

FIG. 33

```
3D_PlayList
00000.mpls{
  PlayItem() {
    "00001"; // 00001.clpi (ref_to_B_clpi_file_name)
    type = "D2-B are interleaved";
    STN_table()
  }
  SubPath() [1] {
    SubPath_type=9: "00002"; // ref to 00002.clpi
  }
  SubPath() [2] {
    SubPath_type=8: "00003"; // ref to 00003.clpi
  }
  interleaved_file_info() {
    20000; // 20000.ilvt (ref_to_D2-B_interleaved_file_name)
    00002; // 00002.clpi (ref_to_D2_clpi_file_name)
  }
}
```

FIG. 37

| i | SPN_chunk_start[i] of 00001.clpi | SPN_chunk_start[i] of 00002.clpi | SPN_chunk_start[i] of 00003.clpi |
|---|---|---|---|
| 0 | 0 | 0 | 0 |
| 1 | c1 | b1 | a1 |
| 2 | c2 | b2 | a2 |
| ... | ... | ... | ... |
| n | cn | bn | an |

FIG. 38

```
EP_map() {
    number_of_EP_entries
    for (i=0; i< number_of_EP_entries; i++) {
      PTS_EP_start[i]
      SPN_EP_start[i]
    }
}
```

INFORMATION PROCESSING DEVICE, INFORMATION PROCESSING METHOD, PLAYING DEVICE, PLAYING METHOD, AND PROGRAM

TECHNICAL FIELD

The present invention relates to an information processing device, information processing method, playing device, playing method, and program, and particularly is related to an information processing device, information processing method, playing device, playing method, and program that enables appropriately playing 3D (Dimension) image content from a recording medium.

BACKGROUND ART

For example, as contents such as movies and so forth, two-dimensional (2D) image contents are mainstream, but recently three-dimensional (3D) image contents wherein stereoscopic vision is enabled have attracted attention.

As methods for display of 3D images (hereafter, also called stereo images), there are various types of methods, but in cases of using any method, the data amount of a 3D image is greater than the data amount of a 2D image.

Also, high resolution image contents such as movies may be large in size, and a large capacity recording medium is necessary in order to record such large size image contents as 3D images which have a large amount of data.

As such a large capacity recording medium, for example there is a Blu-Ray (registered trademark) Disc such as BD (Blu-Ray (registered trademark))-ROM (Read Only Memory) and so forth (hereafter, also called BD).

Now, a file managing device has been proposed wherein the recording position on the recording medium of the signal being specified with a predetermined unit smaller than a sector and made into a file by file-creating means, whereby even with editing processing such as separating or combining the filed signals at optional positions the filed signals do not need to be recorded again on the recording medium so as to make into a file only the portion of the signal to be edited, the editing processing can be performed on only the file managing information, whereby the editing processing can be significantly simplified (Patent Document 1).

CITATION LIST

Patent Literature

PTL 1: Japanese Unexamined Patent Application Publication No. 11-195287

SUMMARY OF INVENTION

Technical Problem

Now, according to the current BD standard, how 3D image content is recorded on a BD, or played, has not been defined.

However, if the method of recording and playing of 3D image content is dependent on the author that authors the 3D image content, there is a concern that the 3D image content cannot be appropriately played.

The present invention has been made in light of such a circumstance, and is to enable appropriate playing of stereo image (3D image) content from a recording medium such as BD.

A playing device according to a first aspect of the present invention has: reading means which read out, from a recording medium, an interleaved file, which is a file in which are interleaved, in chunk increments of a predetermined data amount, a first multiplexed stream including, out of a basic stream generated by a video stream having been encoded with a predetermined encoding method and an expanded stream, the basic stream, and a second multiplexed stream including the expanded stream corresponding to the basic stream, read out a first information file which is information of the first multiplexed stream and which has the number of chunks making up the multiplexed stream and a starting packet number within the first multiplexed stream for each chunk, and read out a second information file which is information of the second multiplexed stream and which has the number of chunks making up the second multiplexed stream and a starting packet number within the second multiplexed stream for each chunk; and separating means to separate the interleaved file into the first multiplexed stream and the second multiplexed stream, using the first information file and the second information file.

An arrangement may be made wherein the chunk is a collection of source packets continuously arrayed on the recording medium.

An arrangement may be made wherein the number of the chunks that the first information file has and the number of the chunks that the second information file has are the same number.

An arrangement may be made wherein the first information file further has information of the total number of source packets making up the first multiplexed stream; and the second information file further has information of the total number of source packets making up the second multiplexed stream.

An arrangement may be made wherein, when the number of the chunks that the first information file has is expressed as (n+1), the chunks making up the first multiplexed stream as B[i] (i=0 through n), and the k'th chunk from the head of the first multiplexed stream as B[k], the chunks making up the second multiplexed stream is expressed as D[i] (i=0 through n), and the k'th chunk from the head of the second multiplexed stream as D[k], the starting packet number of B[k] is expressed as SPN_chunk_start_1[k], the starting packet number of D[k] is expressed as SPN_chunk_start_2[k], the total number of source packets making up the first multiplexed stream is expressed as number_of_source_packets1, and the total number of source packets making up the second multiplexed stream is expressed as number_of_source_packets2, the separating means may be caused to calculate the number of source packets making up B[k] by (SPN_chunk_start_1[k+1]−SPN_chunk_start_1[k]), where k=0~(n−1), calculate the number of source packets making up D[k] by (SPN_chunk_start_2[k+1]−SPN_chunk_start_2[k]), where k=0 through (n−1), calculate the number of source packets making up B[n] by (number_of_source_packets1−SPN_chunk_start_1[n]), and calculate the number of source packets making up D[n] by (number_of_source_packets2−SPN_chunk_start_2[n]).

An arrangement may be made wherein a set of chunks having the same value of I have the same playing time regarding B[i] and D[i].

Control means to control readout by the readout means may be further provided. In this case, the control means may be caused to read out an EP_map which is information of the first multiplexed stream and information having the number of entry points within the first multiplexed stream, a PTS_EP_ start[i] indicating a PTS (presentation Time Stamp), and an SPN_EP_start[i] which is a source packet number showing a position for each entry point; detect a PTS_EP_start[m] having a value smaller than and nearest a specified playing start point-in-time; detect an SPN_EP_start[m] corresponding to the PTS_EP_start[m]; detect an SPN_chunk_start_1[k] having a value smaller than and nearest SPN_EP_start[m], and k thereof; and determine the sum of SPN_chunk_start_1[k] and SPN_chunk_start_2[k] as a readout starting address of the interleaved file.

An arrangement may be made wherein the basic stream and the expanded stream are the Base view video stream and Dependent view video stream, respectively, that are generated by the video streams being encoded by H.264 AVC/MVC.

A playing method according to the first aspect of the present invention includes the steps of: reading out from a recording medium an interleaved file which is a file in which are interleaved in chunk increments of a predetermined data amount with a first multiplexed stream including, out of a basic stream generated by a video stream having been encoded with a predetermined encoding method and an expanded stream, the basic stream, and a second multiplexed stream including the expanded stream corresponding to the basic stream; reading out a first information file which is information of the first multiplexed stream and which has the number of chunks making up the multiplexed stream and a starting packet number within the first multiplexed stream for each chunk, and reading out a second information file which is information of the second multiplexed stream and which has the number of chunks making up the second multiplexed stream and a starting packet number within the second multiplexed stream for each chunk; and separating the interleaved file into the first multiplexed stream and the second multiplexed stream, using the first information file and the second information file.

A program according to the first aspect of the present invention causes a computer to execute processing including the steps of: reading out from a recording medium an interleaved file which is a file in which are interleaved in chunk increments of a predetermined data amount with a first multiplexed stream including, out of a basic stream generated by a video stream having been encoded with a predetermined encoding method and an expanded stream, the basic stream, and a second multiplexed stream including the expanded stream corresponding to the basic stream; reading out a first information file which is information of the first multiplexed stream and which has the number of chunks making up the multiplexed stream and a starting packet number within the first multiplexed stream for each chunk, and reading out a second information file which is information of the second multiplexed stream and which has the number of chunks making up the second multiplexed stream and a starting packet number within the second multiplexed stream for each chunk; and separating the interleaved file into the first multiplexed stream and the second multiplexed stream, using the first information file and the second information file.

An information processing device according to a second aspect of the present invention has: setting means which set recording state information indicating whether or not the basic stream data and the expanded stream data is recorded on an optical disc in the state of being interleaved in increments of extents which is a predetermined data increment, in a playing managing information file that manages the playing of the basic stream and expanded stream generated by encoding multiple pieces of video data with a predetermined encoding method; and set, in the case of being recorded in the state of being interleaved in the increments of extents, a virtual file that manages the basic stream and the expanded stream as the playing managing information file.

An arrangement may be made wherein the setting means further set identifying information of a clip information file describing information relating to a clip which is a playing section of the basic stream and identifying information of the clip information file describing information relating to the clip of the expanded stream that is used to play a 3-dimensional image along with the basic stream clip.

An arrangement may be made wherein the setting means set information relating to the extents of the basic stream in the clip information file of the basic stream; and set information relating to the extents of the expanded stream in the clip information file of the expanded stream.

An arrangement may be made wherein the basic stream and the expanded stream are the Base view video stream and Dependent view video stream, respectively, that are generated by the video streams being encoded by H.264 AVC/MVC.

An information processing method according to the second aspect of the present invention includes the steps of: setting recording state information indicating whether or not the basic stream data and the expanded stream data is recorded on an optical disc in the state of being interleaved in increments of extents which is a predetermined data increment, in a playing managing information file that manages the playing of the basic stream and expanded stream generated by encoding multiple pieces of video data with a predetermined encoding method; and setting, in the case of being recorded in the state of being interleaved in the increments of extents, a virtual file that manages the basic stream and the expanded stream in the playing managing information file.

A program according to a second aspect of the present invention causes a computer to execute processing including the steps of: setting recording state information indicating whether or not the basic stream data and the expanded stream data is recorded on an optical disc in the state of being interleaved in increments of extents which is a predetermined data increment, in a playing managing information file that manages the playing of the basic stream and expanded stream generated by encoding multiple pieces of video data with a predetermined encoding method; and setting, in the case of being recorded in the state of being interleaved in the increments of extents, a virtual file that manages the basic stream and the expanded stream in the playing managing information file.

A playing device according to a third aspect of the present invention has: control means to cause the basic stream and the expanded stream to be read out from the optical disc, based on a virtual file that manages the basic stream and the expanded stream that are set in the playing managing information file, in the case that recording state information indicating whether or not the basic stream data and the expanded stream data is recorded on an optical disc in the state of being interleaved in increments of extents which is a predetermined data increment, which is set in a playing managing information file that manages the playing of the basic stream and expanded stream generated by encoding multiple pieces of video data with a predetermined encoding method, indicates that the data is recorded in an interleaved state in the extent increments.

Playing means to play the basic stream and the expanded stream that are read out from the optical disc may be further provided.

Separating means may be further provided to separate data read out by the control means into the basic stream data and the expanded stream data, based on information relating to the extent set in the respective clip information files, in the case that identifying information of the clip information file wherein information relating to the extent of the basic stream is described as information relating to a clip which is a playing section of the basic stream and identifying information of the clip information file wherein information relating to the extent of the expanded stream is described as information relating to the clip of the expanded stream which is used for playing of a three-dimensional image along with the clip of the basic stream are set in the playing managing information file.

An arrangement may be made wherein the information relating to the extent is a number of a source packet that starts each of the extents within a stream file tied to the clip.

An arrangement may be made wherein the basic stream and the expanded stream are the Base view video stream and Dependent view video stream, respectively, that are generated by the video streams being encoded by H.264 AVC/MVC.

A playing method according to the third aspect of the present invention includes the steps of: causing the basic stream and the expanded stream to be read out from the optical disc, based on a virtual file that manages the basic stream and the expanded stream that are set in the playing managing information file, in the case that recording state information indicating whether or not the basic stream data and the expanded stream data is recorded on an optical disc in the state of being interleaved in increments of extents which is a predetermined data increment, which is set in a playing managing information file that manages the playing of the basic stream and expanded stream generated by encoding multiple pieces of video data with a predetermined encoding method, indicates that the data is recorded in an interleaved state in the extent increments.

A program according to the third aspect of the present invention causes a computer to execute processing including the steps of: causing the basic stream and the expanded stream to be read out from the optical disc, based on a virtual file that manages the basic stream and the expanded stream that are set in the playing managing information file, in the case that recording state information indicating whether or not the basic stream data and the expanded stream data is recorded on an optical disc in the state of being interleaved in increments of extents which is a predetermined data increment, which is set in a playing managing information file that manages the playing of the basic stream and expanded stream generated by encoding multiple pieces of video data with a predetermined encoding method, indicates that the data is recorded in an interleaved state in the extent increments.

A playing device according to a fourth aspect of the present invention has: control means which, in the case that recording state information, indicating whether or not basic stream data and expanded stream data set in a playing managing information file that manages the playing of the basic stream and expanded stream generated by encoding multiple pieces of video data with a predetermined encoding method, is recorded on an optical disc in the state of being interleaved in increments of extents which is a predetermined data increment, indicates that the data is recorded in an interleaved state in the extent increments, refer to a virtual file that manages the basic stream and the expanded stream that are set in the playing managing information file, and in the case that the identifying information of the clip information file describing information relating to a clip which is a playing section of the expanded stream that is managed by the virtual file set as the playing managing information file, and the identifying information of the clip information file of a clip of the expanded stream recorded on the optical disc, do not match, read out the data of the basic stream clip from the optical disc, and read out data of a clip of the expanded stream recorded in a recording medium other than the optical disc as data of a clip of the expanded stream used to play three-dimensional images along with the data of the clip of the basic stream.

An arrangement may be made wherein the basic stream and the expanded stream are the Base view video stream and Dependent view video stream, respectively, that are generated by the video streams being encoded by H.264 AVC/MVC.

A playing method according to a fourth aspect of the present invention includes the steps of: referencing a virtual file that manages the basic stream and the expanded stream that are set in the playing managing information file in the case that recording state information indicating whether or not the basic stream data and the expanded stream data set in a playing managing information file that manages the playing of the basic stream and expanded stream generated by encoding multiple pieces of video data with a predetermined encoding method, is recorded on an optical disc in the state of being interleaved in increments of extents which is a predetermined data increment, indicates that the data is recorded in an interleaved state in the extent increments; reading out the data of the basic stream clip from the optical disc in the case that the identifying information of the clip information file wherein information relating to a clip which is a playing section of the expanded stream that is managed by the virtual file set as the playing managing information file is described, and the identifying information of the clip information file of a clip of the expanded stream recorded on the optical disc, do not match; and reading out the data of a clip of the expanded stream recorded in a recording medium differing from the optical disc, as data of a clip of the expended stream used to play three-dimensional images along with the data of the clip of the basic stream.

A program according to the fourth aspect of the present invention causes a computer to execute processing including the steps of: referencing a virtual file that manages the basic stream and the expanded stream that are set in the playing managing information file in the case that recording state information indicating whether or not the basic stream data and the expanded stream data set in a playing managing information file that manages the playing of the basic stream and expanded stream generated by encoding multiple pieces of video data with a predetermined encoding method, is recorded on an optical disc in the state of being interleaved in increments of extents which is a predetermined data increment, indicates that the data is recorded in an interleaved state in the extent increments; reading out the data of the basic stream clip from the optical disc in the case that the identifying information of the clip information file wherein information relating to a clip which is a playing section of the expanded stream that is managed by the virtual file set as the playing managing information file is described, and the identifying information of the clip information file of a clip of the expanded stream recorded on the optical disc, do not match; and reading out the data of a clip of the expanded stream recorded in a recording medium differing from the optical disc, as data of a clip of the expended stream used to play three-dimensional images along with the data of the clip of the basic stream.

With the first aspect of the present invention, an interleaved file which is a file in which are interleaved in chunk increments of a predetermined data amount, a first multiplexed stream including, out of a basic stream generated by a video stream having been encoded with a predetermined encoding method and an expanded stream, the basic stream, and a second multiplexed stream including the expanded stream corresponding to the basic stream is read out from a recording medium, and a first information file which is information of the first multiplexed stream and which has the number of chunks making up the multiplexed stream and a starting packet number within the first multiplexed stream for each chunk is read out. Also, a second information file which is information of the second multiplexed stream and which has the number of chunks making up the second multiplexed stream and a starting packet number within the second multiplexed stream for each chunk is read out; and the interleaved file is separated into the first multiplexed stream and the second multiplexed stream, using the first information file and the second information file.

With the second aspect of the present invention, recording state information indicating whether or not the basic stream data and the expanded stream data is recorded on an optical disc in the state of being interleaved in increments of extents which is a predetermined data increment, is set in a playing managing information file that manages the playing of the basic stream and expanded stream generated by encoding multiple pieces of video data with a predetermined encoding method, and in the case of being recorded in the state of being interleaved in the increments of extents, a virtual file that manages the basic stream and the expanded stream is set as the playing managing information file.

With the third aspect of the present invention, the basic stream and the expanded stream are read out from the optical disc, based on a virtual file that manages the basic stream and the expanded stream that is set as the playing managing information file, in the case that recording state information indicating whether or not the basic stream data and the expanded stream data is recorded on an optical disc in the state of being interleaved in increments of extents which is a predetermined data increment, which is set in a playing managing information file that manages the playing of the basic stream and expanded stream generated by encoding multiple pieces of video data with a predetermined encoding method, indicates that the data is recorded in an interleaved state in the extent increments.

With the fourth aspect of the present invention, in the case that recording state information indicating whether or not the basic stream data and the expanded stream data set in a playing managing information file that manages the playing of the basic stream and expanded stream generated by encoding multiple pieces of video data with a predetermined encoding method, is recorded on an optical disc in the state of being interleaved in increments of extents which is a predetermined data increment, indicates that the data is recorded in an interleaved state in the extent increments, a virtual file that manages the basic stream and the expanded stream that is set as the playing managing information file is referenced in the case that the identifying information of the clip information file wherein information relating to a clip which is a playing section of the expanded stream that is managed by the virtual file set in the playing managing information file is described, and the identifying information of the clip information file of a clip of the expanded stream recorded on the optical disc, do not match, the data of the basic stream clip is read out from the optical disc, and data of a clip of the expanded stream recorded in a recording medium differing from the optical disc is read out as data of a clip of the expended stream used to play three-dimensional images along with the data of the clip of the basic stream.

Advantageous Effects of Invention

According to the present invention, stereo image (3D image) contents can be appropriately played.

BRIEF DESCRIPTION OF DRAWINGS

FIG. 11 is a diagram illustrating the syntax of a PlayList file.

FIG. 12 is a diagram illustrating the syntax of PlayList ( ) in FIG. 11.

FIG. 13 is a diagram illustrating the syntax of SubPath ( ) in FIG. 12.

FIG. 14 is a diagram illustrating the syntax of subPlayItem (i) in FIG. 13.

FIG. 15 is a diagram illustrating the syntax of PlayItem ( ) in FIG. 12.

FIG. 16 is a diagram illustrating the syntax of an STN_table ( ) in FIG. 15.

FIG. 17 is a diagram illustrating a specific example of a 3D_PlayList.

FIG. 18 is a diagram illustrating the meaning of type.

FIG. 19 is a diagram illustrating the meaning of SubPath_type.

FIG. 20 is a block diagram illustrating a configuration example of a playing device.

FIG. 22 is a diagram illustrating an example of a 3D_Playlist.

FIG. 23 is a diagram illustrating the syntax of a clpi file.

FIG. 26 is a diagram illustrating an example of the syntax of_chunk_map ( ).

FIG. 27 is a diagram illustrating a specific example of chunk_map ( ).

FIG. 29 is a diagram illustrating another example of a 3D_PlayList.

FIG. 33 is a diagram illustrating yet another 3D_PlayList.

FIG. 37 is a diagram illustrating a summary of the content of the chunk_map ( ) in FIG. 27.

FIG. 38 is a diagram illustrating the syntax of an EP_map ( ).

DESCRIPTION OF EMBODIMENTS

[Configuration of Playing System]

Figure 1:
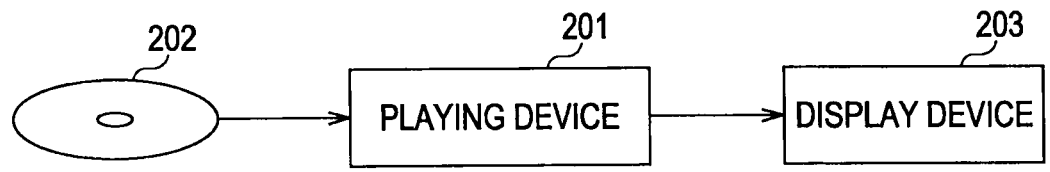
FIG. 1 is a diagram illustrating a configuration example of a playing system including a playing device to which the present invention has been applied.

FIG. 1 shows a configuration example of a playing system including a playing device 201 to which the present invention has been applied.

As shown in FIG. 1, the playing system is configured by the playing device 201 and a display device 203 being connected by an HDMI (High Definition Multimedia Interface) cable or the like. An optical disc 202 such as a BD is mounted on the playing device 201.

A stream necessary for displaying a stereo image (3D image) of which the number of view points is two, is recorded on the optical disc 202.

The data for each stream is recorded on the optical disc 202 in an interleaved state, in increments of extents.

The playing device 201 is a player corresponding to 3D playing of a stream recorded on the optical disc 202. The playing device 201 plays a stream that is recorded on the optical disc 202, and displays the 3D images that have been obtained by playing on a display device 203 made up of a television receiver or the like. Audio is also similarly played by the playing device 201, and output from a speaker or the like provided on the display device 203.

A stream whereby 3D images can be displayed is recorded on the optical disc 202. As an encoding method to record the stream on the optical disc 202, for example, H.264 AVC (Advanced Video Coding)/MVC (Multi-view Video coding) is used.

[H.264 AVC/MVC Profile]

H.264 AVC/MVC has an image stream called Base view video and an image stream called Dependent view video that are defined. Hereafter, this will be simply called MVC as appropriate.

Figure 2:
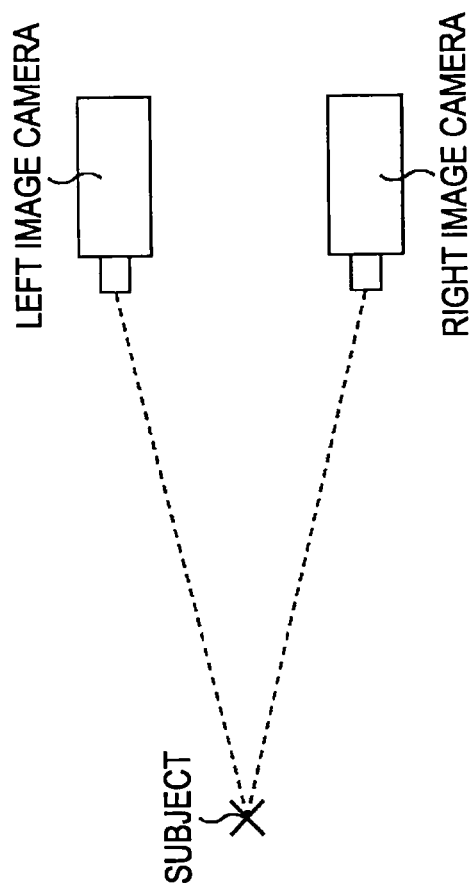
FIG. 2 is a diagram illustrating an example of shooting.

FIG. 2 is a diagram illustrating an example of shooting.

As shown in FIG. 2, shooting is performed by a camera for an L image and a camera for an R image, with the same subject as the target thereof. An elementary stream of a video shot with the camera for the L image and camera for the R image is input to the MVC encoder.

Figure 3:
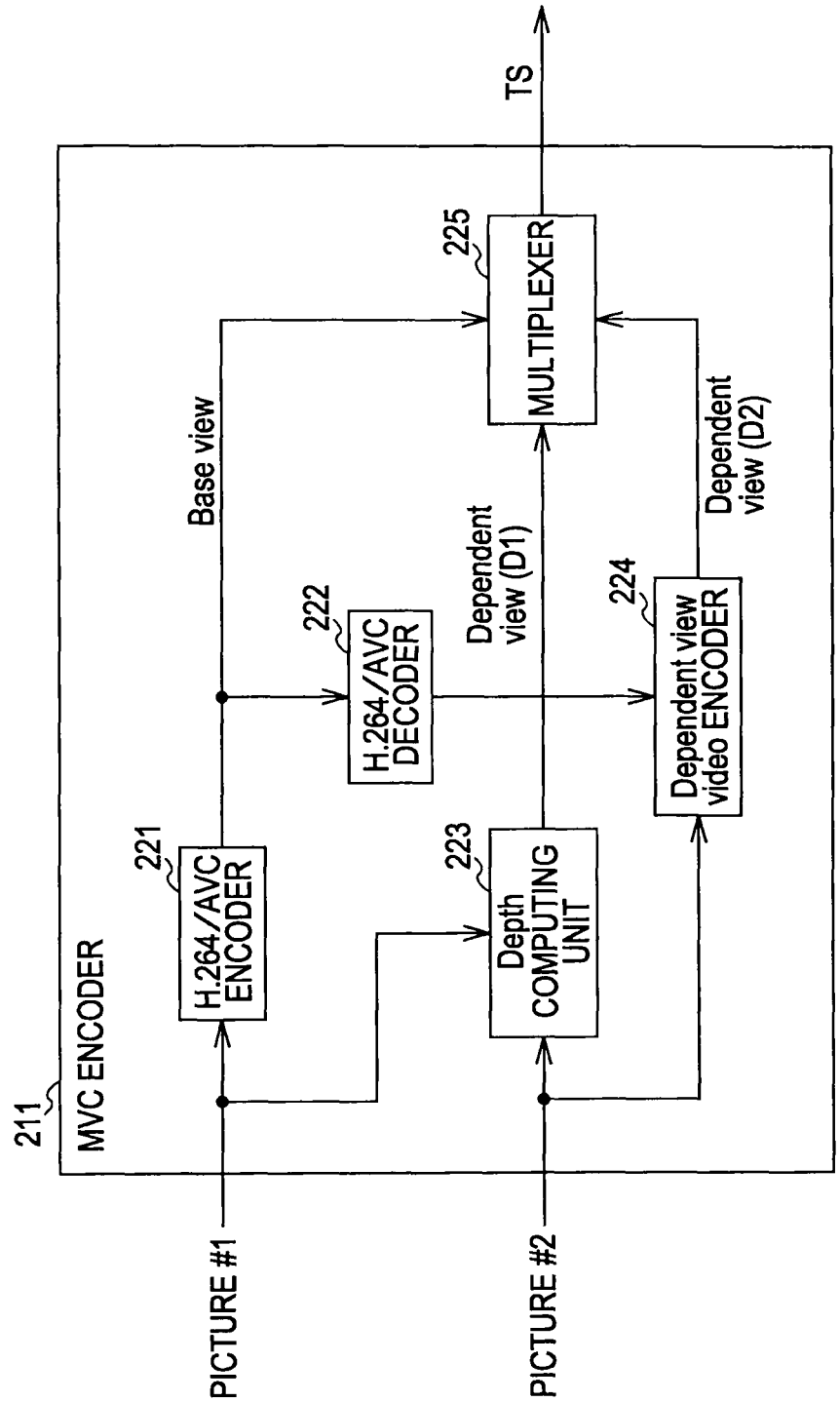
FIG. 3 is a block diagram illustrating a configuration example of an MVC encoder.

FIG. 3 is a block diagram illustrating a configuration example of the MVC encoder.

As shown in FIG. 3, the MVC encoder 211 is made up of an H.264/AVC encoder 221, H.264/AVC decoder 222, Depth computing unit 223, Dependent view video encoder 224, and multiplexer 225.

The stream of the video #1 shot by the camera for L image to input in the H.264/AVC encoder 221 and Depth computing unit 223. Also, the stream of the video #2 shot by the camera for R image is input to the Depth computing unit 223 and Dependent view video encoder 224. The stream of the video #2 may be input to the H.264/AVC encoder 221 and Depth computing unit 223 and the stream of the video #1 input to the Depth computing unit 223 and Dependent view video encoder 224.

The H.264/AVC encoder 221 encodes the video #1 as an H.264 AVC/High Profile video stream, for example. The H.264/AVC encoder 221 outputs the AVC video stream obtained by encoding to the H.264/AVC decoder 222 and multiplexer 225 as a Base view video stream.

The H.264/AVC decoder 222 decodes the AVC video stream supplied from the H.264/AVC encoder 221, and outputs the stream of the video #1 obtained by decoding to the Dependent view video encoder 224.

The Depth computing unit 223 computes the stream of the video #1 and the stream of the video #2 based on Depth (parallax), and outputs the computed Depth data to the multiplexer 225.

The Dependent view video encoder 224 encodes the stream of the video #1 supplied from the H.264/AVC decoder 222 and the stream of the video #2 input externally, and outputs a Dependent view video stream.

Figure 4:
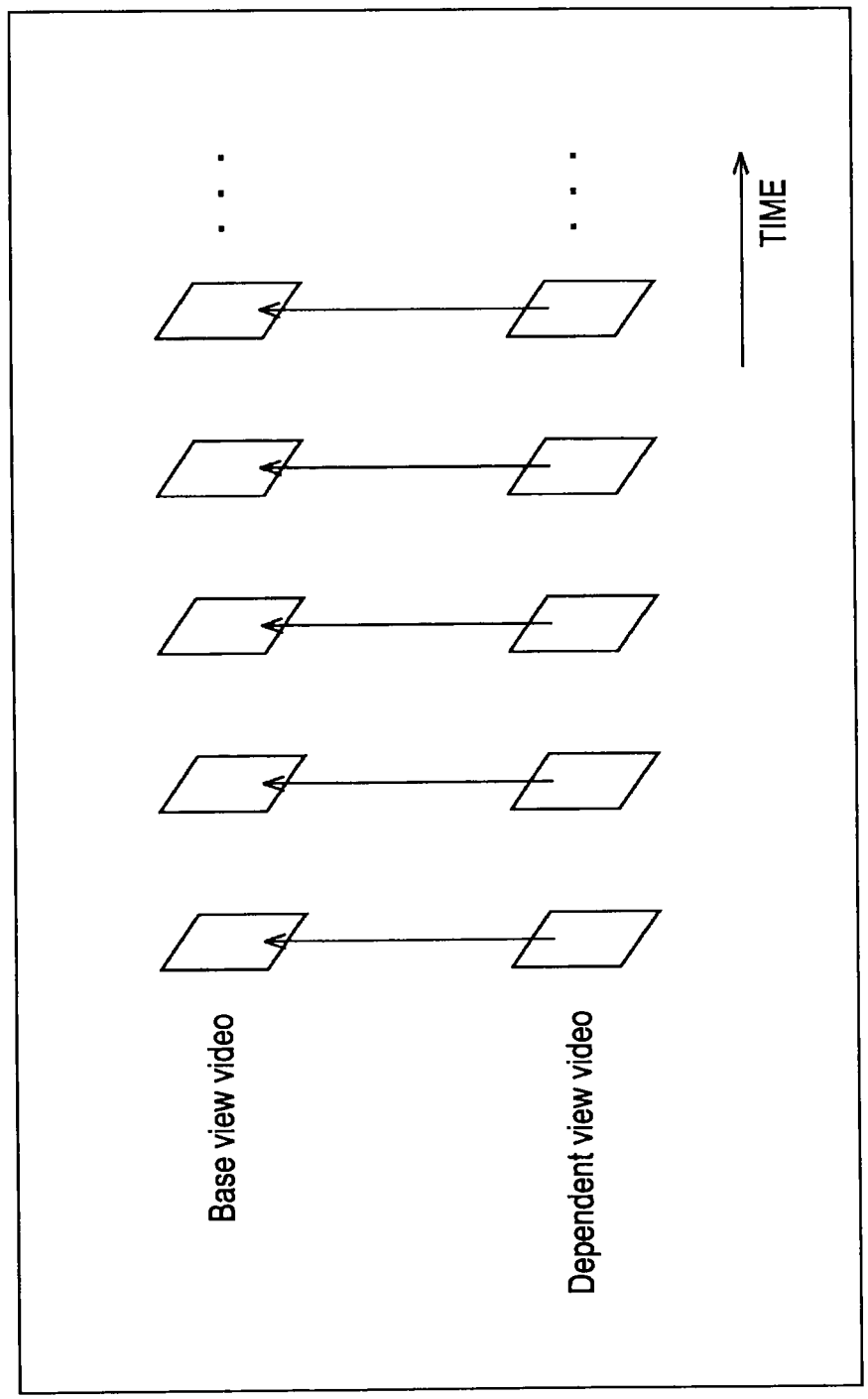
FIG. 4 is a diagram illustrating an example of a reference image.

The Base view video does not permit predictive encoding which uses another stream as a reference image, but as shown in FIG. 4, predictive encoding is permitted which uses Base view video as a reference image. For example, in the case of performing encoding where the L image is a Base view video and the R image is a Dependent view video, the data amount of the Dependent view video stream obtained as a result thereof becomes less compared to the data amount of the Base view video stream.

Now, because of encoding with H.264/AVC, estimation in the temporal direction is performed for Base view video. Also, estimation in the temporal direction, along with estimation between views, are performed for Dependent view video. In order to decode the Dependent view video, decoding of the corresponding Base view video which is the reference source at time of encoding, has to be ended beforehand.

The Dependent view video encoder 224 outputs the Dependent view video stream obtained by encoding using such estimation between views to the multiplexer 225.

The multiplexer 225 multiplexes the Base view video stream supplied from the H.264/AVC encoder 221, the Dependent view video stream supplied from the Depth computing unit 223 (Depth data), and the Dependent view video stream supplied from the Dependent view video encoder 224, as an MPEG2 TS, for example. The Base view video stream and Dependent view video stream may be multiplexed into one MPEG2 TS, or may be included in separate MPEG2 TSs.

The multiplexer 225 outputs the generated TS (MPEG2 TS). The TS output from the multiplexer 225 is recorded to an optical disc 202 on a recording device along with other management data, and is provided to the playing device 201 in a form as recorded on the optical disc 202.

Hereafter, of the two Dependent view videos, the Dependent view video made up of Depth information is called a D1 view video, the Dependent view video made up of an R image is called a D2 view video. Note that the Dependent view video made up of the R image can be processed as the D1 view video, and the Dependent view video made up of Depth information processed as the D2 view video.

Also, 3D playing that is performed using the Base view video and D1 view video is called B-D1 playing. The 3D playing that is performed using the Base view video and D2 view video is called B-D2 playing.

In the case of performing B-D1 playing according to instructions by a user and so forth, the playing device 201 reads out and plays the Base view video stream and the D1 view video stream from the optical disc 202.

Also, in the case of performing B-D2 playing, the playing device 201 reads out and plays the Base view video stream and D2 view video stream from the optical disc 202.

Further, in the case of performing normal 2D image playing, the playing device 201 reads out and plays only the Base view video stream from the optical disc 202.

The Base view video stream is an AVC video stream encoded with H.264/AVC, whereby if a player is compatible with a BD format, the Base view video stream thereof can be played, and a 2D image can be displayed.

[TS Configuration Example]

Figure 5:
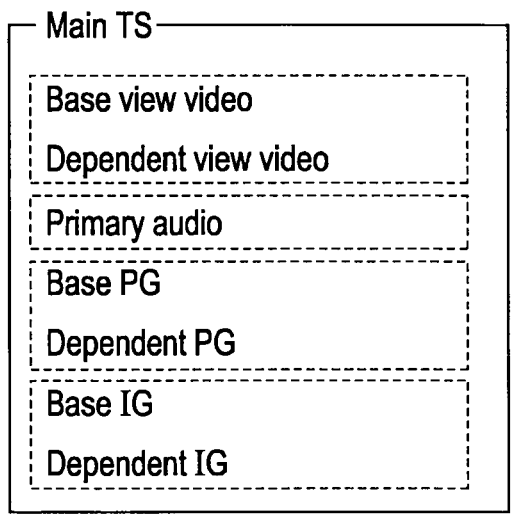
FIG. 5 is a diagram illustrating a configuration example of a TS.

FIG. 5 is a diagram showing a TS configuration example.

Streams for each of the Base view video, Dependent view video, Primary audio, Base PG, Dependent PG, Base IG, and Dependent IG are multiplexed in the Main TS in FIG. 5. Thus, the Dependent view video stream along with the Base view video stream may be included in the Main TS.

The Main TS and Sub TS are recorded in the optical disc 202. The Main TS is a TS including at least the Base view video stream. The Sub TS is a TS that includes streams other than the Base view video stream, and is used along with the Main TS.

Streams for each of the Base view and Dependent view are prepared for PG and IG also, so that the 3D display is enabled similar to the video.

Figure 6:
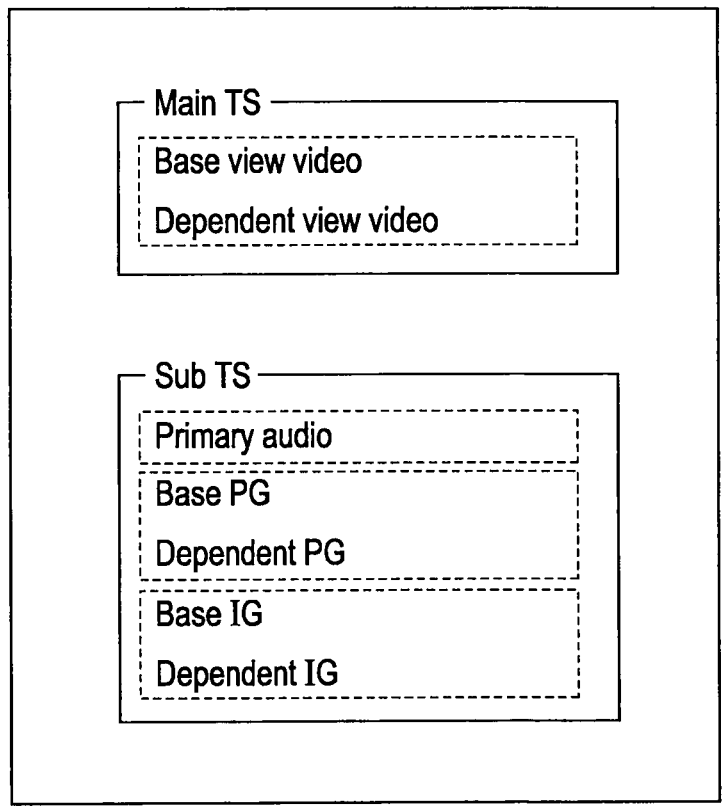
FIG. 6 is a diagram illustrating another configuration example of a TS.

FIG. 6 is a diagram showing another configuration example of a TS.

Streams for each of the Base view video and Dependent view video are multiplexed in the Main TS of FIG. 6.

On the other hand, streams for each of the Primary audio, Base PG, Dependent PG, Base IG, and Dependent IG are multiplexed in the Sub TS.

Thus, the video stream may be multiplexed in the Main TS and the streams of PG, IG, and so forth multiplexed in the Sub TS.

Figure 7:
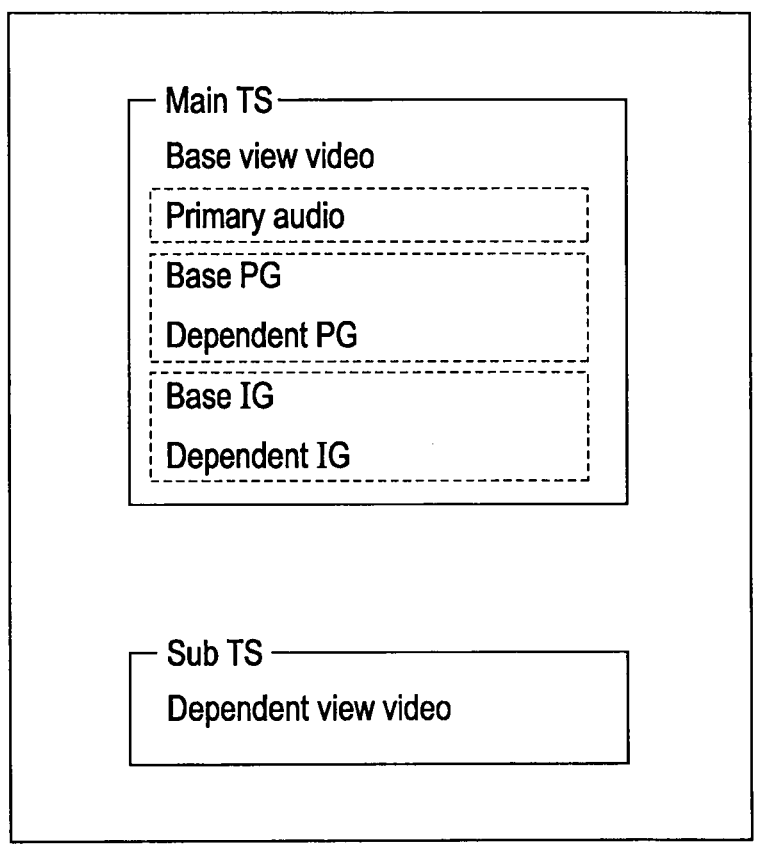
FIG. 7 is a diagram illustrating yet another configuration example of a TS.

FIG. 7 is a diagram illustrating yet another configuration example of a TS.

Streams for each of the Base view video, Primary audio, Base PG, Dependent PG, Base IG, and Dependent IG are multiplexed in the Main TS in FIG. 7.

On the other hand, the Dependent view video stream is included in the Sub TS.

Thus, the Dependent view video stream may at times be included in a TS that is separate from the Base view video stream.

[Application Format]

Figure 8:
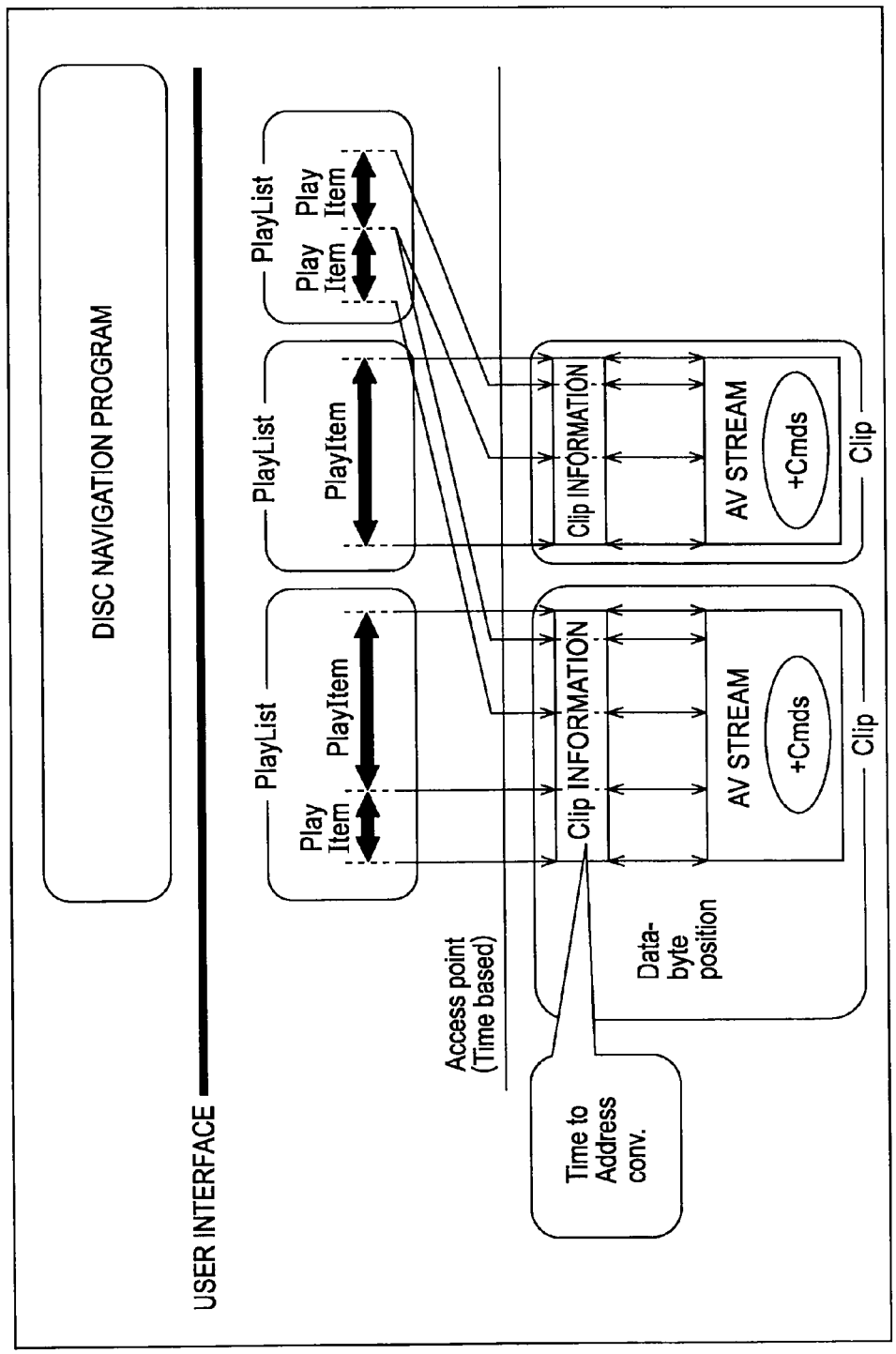
FIG. 8 is a diagram illustrating an example of management of an AV stream.

FIG. 8 is a diagram showing an example of AV stream management by the playing device 201.

Management of the AV stream is performed using two layers of the PlayList and Clip, as shown in FIG. 8. The AV stream may be recorded not only on the optical disc 202, but also on a local storage of the playing device 201.

Now, a pair of one AV stream and Clip Information which is information appended thereto is considered to be one object, and these together are called a Clip. Hereafter, a file storing the AV stream will be called an AV stream file. Also, a file storing the Clip Information will also be called a Clip Information file.

The AV stream is mapped on the temporal axis, and an access point for each Clip is primarily specified in the PlayList with a time stamp. The Clip Information file is used to find an address that is to start decoding within an AV stream and so forth.

The PlayList is a collection of AV stream playing sections. One playing section in the AV stream is called a PlayItem. PlayItem is represented by an IN point and an OUT point in the playing section on the temporal axis. As shown in FIG. 8, the PlayList is made up of one or multiple PlayItems.

The PlayList that is first from the left in FIG. 8 is made up of two PlayItems, and from the two PlayItems thereof, the front half portion and latter half portion of the AV stream included in the Clip on the left side are referenced, respectively.

The PlayList that is second from the left is made up of one PlayItem, whereby the entire AV stream included in the Clip on the right side is referenced.

The PlayList that is third from the left is made up of two PlayItems, and from the two PlayItems thereof, a portion having an AV stream included in the Clip on the left side and a portion having an AV stream included in the Clip on the right side are referenced, respectively.

For example, in the case that the PlayItem on the left side that is included in the PlayList that is first from the left is specified as a playing target by a disk navigation program, playing is performed of the front half portion of the AV stream included in the left side Clip, which is reference by the PlayItem thereof. Thus, the PlayList is used as playing management information to manage the playing of the AV streams.

Within the PlayList, the playing path made according to the array of one or more PlayItems is called a Main Path.

Also, within the PlayList, a playing path made according to one or more SubPlayItems, parallel to the Main Path, is called a Sub Path.

Figure 9:
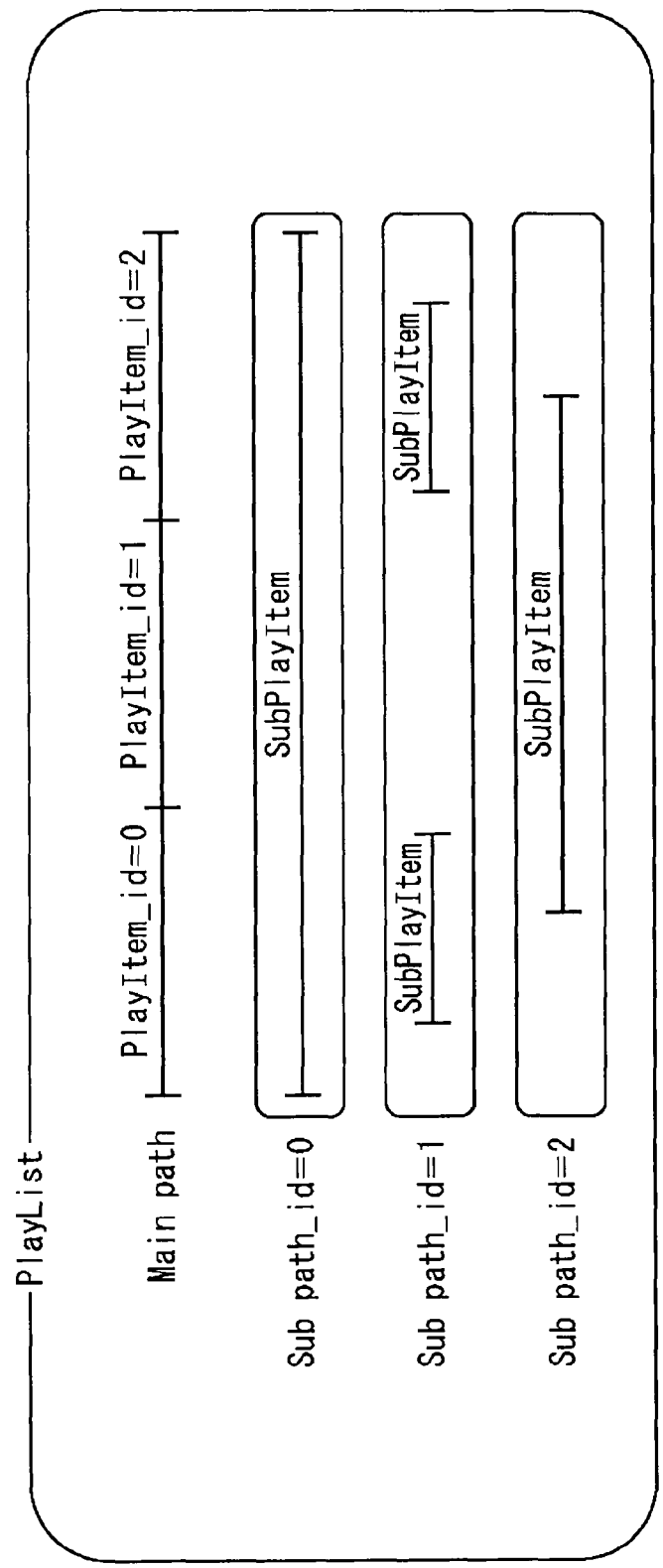
FIG. 9 is a diagram illustrating a configuration of Main Path and Sub Path.

FIG. 9 is a diagram showing a configuration of a Main Path and a Sub Path.

A PlayList can have one Main Path and one or more Sub Paths.

The above-described Base view video stream is managed as a stream that a PlayItem making up the Main Path references. Also, the Dependent view video stream is managed as a stream that a SubPlayItem making up the Sub Path manages.

The PlayList in FIG. 9 has one Main Path made up from the array of three PlayItems, and three Sub Paths.

The PlayItem making up the Main Path has an ID set in sequence from the beginning. The Sub Paths also have IDs of Subpath_id=0, Subpath_id=1, and Subpath_id=2, in sequence from the beginning.

With the example in FIG. 9, one SubPlayItem is included in the Sub Path of Subpath_id=0, and two SubPlayItems are included in the Sub Path of Subpath_id=1. Also, one SubPlayItem is included in the Sub Path of Subpath_id=2.

At least a video stream (main image data) is included in the clip AV stream reference by one PlayItem.

Also, one or more audio streams played with the same timing as (synchronized with) the video stream included in the Clip AV stream may be included in the Clip AV stream, or may not be included.

One or more streams of caption data (PG (Presentation Graphic)) of the bit map that are played synchronized with the video stream included in the Clip AV stream may be included in the Clip AV stream, or may not be included.

One or more IG (Interactive Graphic) streams that are played synchronized with the video stream included in the Clip AV stream file may be included in the Clip AV stream, or may not be included. An IG stream is used to display graphics such as a button operated by a user.

A video stream, and zero or more audio streams zero or more PG streams, and zero or more IG streams that are played synchronized therewith are multiplexed in the Clip AV stream which one PlayItem references.

Also, one SubPlayItem references a video stream, audio stream, or PG stream or the like of a stream that differs from the Clip AV stream (separate stream) which the PlayItem reference.

Managing the AV stream using such PlayList, PlayItem, and SubPlayItem is disclosed in Japanese Unexamined Patent Application Publication No. 2008-252740 and Japanese Unexamined Patent Application Publication No. 2005-348314, for example.

[Directory Configuration]

Figure 10:
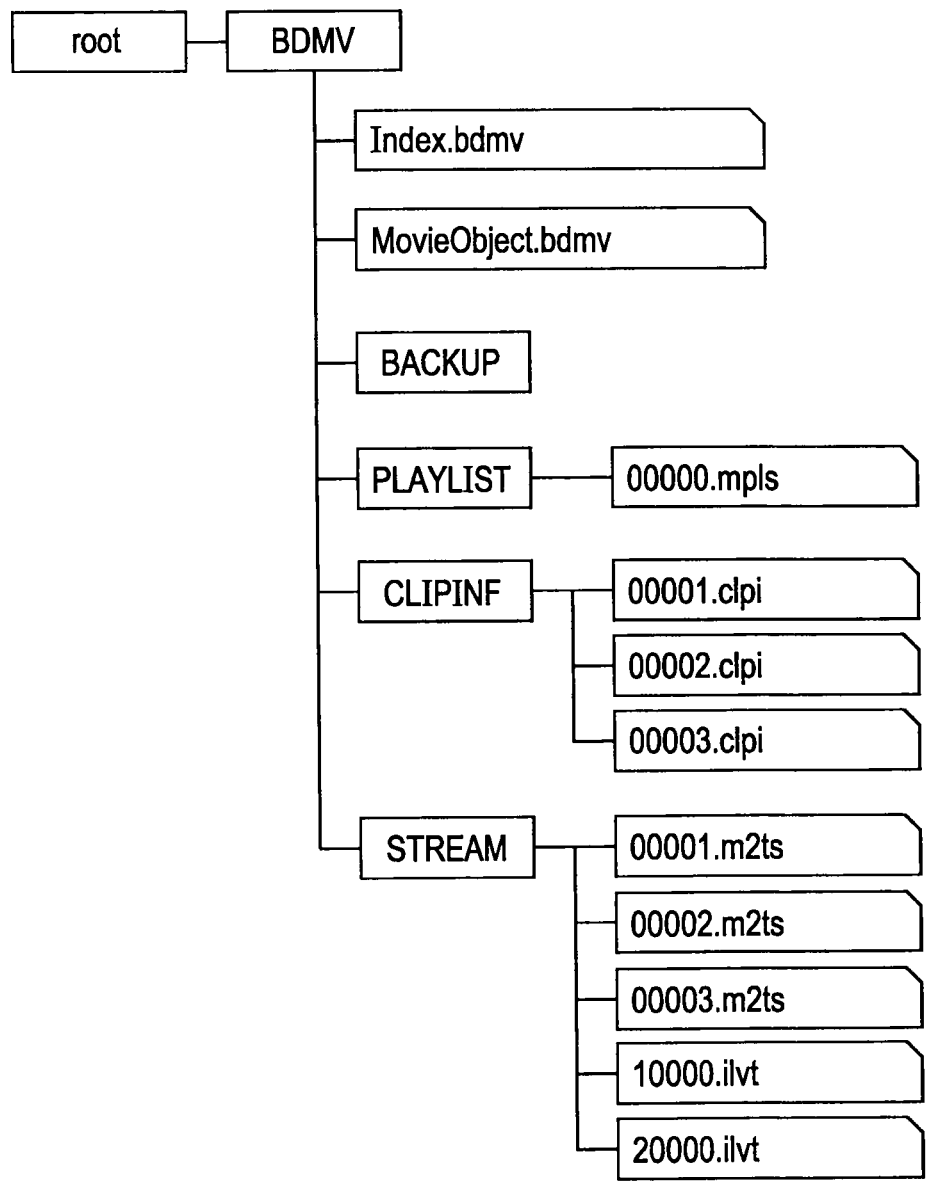
FIG. 10 is a diagram illustrating an example of managing configuration of a file to be recorded on an optical disc.

FIG. 10 is a diagram showing an example of management configuration of a file to be recorded on the optical disc 202.

As shown in FIG. 10, the files are managed in a hierarchical manner with the directory configuration. One root directory is created on the optical disc 202. Below the root directory is the range managed with one recording playing system.

A BDMV directory is placed below the root directory.

Immediately below the BDMV directory, an Index file which is a file having the name set as "Index.bdmv" and a MovieObject file which is a file having the name set as "MovieObject.bdmv" are stored.

Below the BDMV directory, a BACKUP directory, PLAYLIST directory, CLIPINF directory, STREAM directory and so forth are provided.

PlayList files describing the PlayLists are stored in the PLAYLIST directory. Each PlayList file is set with a name combining a five-digit number and the extension ".mpls". One PlayList file shown in FIG. 10 is set with the file name of "00000.mpls".

Clip Information files are stored in the CLIPINF directory. Each Clip Information file is set with a name combining a five-digit number and the extension ".clpi".

The three Clip Information files in FIG. 10 are set with the file names "00001.clpi", "00002.clpi", "00003.clpi", respectively. Hereafter, Clip Information files will be called clpi files, as appropriate.

For example, the "00001.clpi" clpi file is a file describing information relating to a Clip of a Base view video.

The "00002.clpi" clpi file is a file describing information relating to a Clip of a D2 view video.

"00003.clpi" clpi file is a file describing information relating to a Clip of a D1 view video.

Stream files are stored in the STREAM directory. Each stream file is set with a name combining a five-digit number and the extension ".m2ts", or a name combining a five-digit number and the extension ".ilvt". Hereafter, files having the extension ".m2ts" set will be called m2ts files, as appropriate. Also, files having the extension ".ilvt" set will be called ilvt files.

The "00001.m2ts" m2ts file is a file for 2D playing, and by specifying this file, readout of the Base view video stream is performed.

The "00002.m2ts" m2ts file is a D2 view video stream file, and the "00003.m2ts" m2ts file is a D1 view video stream file.

The "10000.ilvt" ilvt file is a file for B-D1 playing, and by specifying this file, readout of the Base view video stream and D1 view video stream is performed.

The "20000.ilvt" ilvt file is a file for B-D2 playing, and by specifying this file, readout of the Base view video stream and D2 view video stream is performed.

Besides that shown in FIG. 10, directories that store audio stream files and so forth are also provided below the BDMV directory.

[Syntax of Various Data]

FIG. 11 is a diagram showing the syntax of a PlayList file.

The PlayList file is a file that is stored in the PLAYLIST directory in FIG. 10 and is set with the extension ".mpls".

type_indicator in FIG. 11 indicates the type of file of "xxxxx.mpls".

version_number indicates the version number of "xxxx.mpls". The version_number is made up of a four-digit number. For example, "0240", which indicates that this is a "3D Spec version", is set in the PlayList file for 3D playing. A PlayList wherein PlayList files set with "0240" are described is a later-described 3D_PlayList.

PlayList_start_address indicates the head address in the PlayList ( ), having a relative number of bytes from the head byte in the PlayList file as units.

PlayListMark_start_address indicates the head address in the PlayListMark ( ), having a relative number of bytes from the head byte in the PlayList file as units.

ExtensionData_start_address indicates the head address in the ExtensionData ( ), having a relative number of bytes from the head byte in the PlayList file as units.

Following the ExtensionData_start_address, a 160-bit reserved_for_future_use is included.

Parameters relating to playing control of the PlayList, such as playing restrictions, are stored in AppInfoPlayList ( ).

Parameters relating to Main Path and Sub Path and so forth are stored in PlayList ( ). The content of PlayList ( ) will be described later.

Mark information of the PlayList, i.e. information relating to a mark, which is a jump destination (jump point) in a user operation or command that commands a chapter jump or the like, is stored in PlayListMark( ).

ExtensionData ( ) is formed so as to enable insertion of private data thereto.

FIG. 12 is a diagram showing the syntax of the PlayList ( ) in FIG. 11.

length is an 32-bit integer with no sign which shows the number of bytes from immediately following the length field to the end of the PlayList ( ). That is to say, the length indicates the number of bytes from reserved_for_future_use to the end of the PlayList.

Following length, 16-bit reserved_for_future_use is prepared.

number_of_PlayItems is a 16-bit field indicating the number of PlayItems in the PlayList. In the case of the example in FIG. 9, the number of PlayItems is three. The value of PlayItem_id is assigned from zero in the order that PlayItem ( ) appears in the PlayList. For example, PlayItem_id=0, 1, 2 in FIG. 9 are assigned.

number_of_SubPaths is a 16-bit field indicating the number of Sub Paths in the PlayList. In the case of the example in FIG. 9, the number of Sub Paths is three. The value of SubPath_id is assigned from zero in the order that SubPath ( ) appears in the PlayList. For example, Subpath_id=0, 1, 2 in FIG. 9 are assigned. In a for-sentence thereafter, PlayItem ( ) is referenced only for the number of PlayItems, and SubPath ( ) is referenced only for the number of Sub Paths.

FIG. 13 is a diagram indicating the syntax of the Sub Path ( ) in FIG. 12.

length is a 32-bit integer with no sign which shows the number of bytes from immediately following the length field to the end of the PlayList ( ). That is to say, the length indicates the number of bytes from reserved_for_future_use to the end of the PlayList.

Following the length, 16-bit reserved_for_future_use is prepared.

SubPath_type is an 8-bit field indicating the type of Sub Path application. SubPath_type is used in the case of indicating, for example, which type a Sub Path is of audio, bitmap caption, or text caption.

Following SubPath_type, 15-bit reserved_for_future_use is prepared.

is_repeat_SubPath is a one-bit field specifying the playing method of a Sub Path, and indicates whether Sub Path playing is repeatedly performed between Main Path playing or whether to perform Sub Path playing only once. For example, this is used in the case that the playing timing of the Clip that the Main Path references and the Clip that the Sub Path reference (in a case wherein the Main Path is a path of a still image slide show, and Sub Path is a path of audio that is background music).

Following is_repeat_SubPath, 8-bit reserved_for_future_use is prepared.

number_of_SubPlayItems is an 8-bit field indicating the number of SubPlayItem in one Sub Path (number of entries).

For example, the number_of_SubPlayItems of the SubPlayItem wherein SubPath_id=0 in FIG. 9 is 1, and the number_of_SubPlayItems of the SubPlayItem wherein SubPath_id=1 is 2. In a for-sentence thereafter, SubPlayItem ( ) is referenced only the number of SubPlayItems.

FIG. 14 is a diagram showing the syntax of the SubPlayItem (i) in FIG. 13.

length is a 16-bit integer with no sign which shows the number of bytes from immediately following the length field to the end of the Sub PlayItem( ).

The SubPlayItem (i) in FIG. 14 describes separately a case wherein the SubPlayItem references one Clip and the case of referencing multiple Clips.

A case wherein the SubPlayItem references one Clip will be described.

Clip_Information_file_name [0] indicates the name of the Clip Information file referenced by the SubPlayItem.

Clip_codec_identifier [0] indicates a codec method of the Clip. Following Clip_codec_identifier [0], reserved_for_future_use is prepared.

is_multi_Clip_entries is a flag indicating the existence of a multi Clip registration. In the case that the is_multi_Clip_entries flag is on, syntax in the case that the SubPlayItem references multiple Clips is referenced.

ref_to_STC_id [0] is information relating to STC non-continuous points (non-continuous points of system time base).

SubPlayItem_IN_time indicates the starting position of a Sub Path playing section, and SubPlayItem_OUT_time indicates the end position.

sync_PlayItem_id and sync_start_PTS_of_PlayItem indicate the point-in-time on the temporal axis of the Main Path that the Sub Path starts playing.

SubPlayItem_IN_time, SubPlayItem_OUT_time, sync_PlayItem_id, and sync_start_PTS_of_PlayItem are used in common by the Clip referenced by SubPlayItem.

Description will be given in the case that "if (is_multi_Clip_entries==1b" and that SubPlayItem references multiple Clips.

num_of_Clip_entries indicates the number of Clips to be referenced. The number of Clip_Information_file_name [Subclip_entry_id] specifies the number of Clips, excluding Clip_Information_file_name [0].

Clip_codec_identifier [SubClip_entry_id] indicates the codec method of the Clip.

ref_to_STC_id [SubClip_entry_id] is information relating to STC non-continuous points (non-continuous points of system time base). Following ref_to_STC_id [SubClip_entry_id], reserved_for_future_use is prepared.

FIG. 15 is a diagram indicating the syntax of a Play Item ( ) in FIG. 12.

length is a 16-bit integer with no sign which shows the number of bytes from immediately following the length field to the end of the PlayItem( ).

Clip_Information_file_name [0] indicates the name of the Clip Information file referenced by the PlayItem. Note that the same five-digit number is included in the file name of the m2ts file including the Clip and the file name of the clip Information file corresponding thereto.

Clip_codec_identifier [0] indicates a codec method of the Clip. Following Clip_codec_identifier [0], reserved_for_future_use is prepared. Following the reserved_for_future_use, is_multi_angle and connection_condition are included.

ref_to_STC_id [0] is information relating to STC non-continuous points (non-continuous points of system time base).

IN_time indicates the starting position in the PlayItem playing section, and OUT_time indicates the ending position.

Following OUT_time, UO_mas_table ( ), PlayItem_random_access_mode, and still_mode are included.

Information of an AV stream that an object PlayItem references is included in the STN_table ( ). Also, in the case there is a Sub Path that to be played in a manner correlated with the object PlayItem, information of the AV stream that the SubPlayItems making up the Sub Path references also included.

FIG. 16 is a diagram showing the syntax of the STN_table ( ) in FIG. 15.

The STN_table ( ) is set as an attribute of the PlayItem.

length is a 16-bit integer with no sign which shows the number of bytes from immediately following the length field to the end of the PlayList ( ). Following the length, 16-bit reserved_for_future_use is prepared.

number_of_video_stream_entries indicates the number of streams to be entered (registered) in the STN_table ( ), wherein a video stream_id is provided.

video_stream_id is information to identify the video stream. For example, a Base view video stream is identified by the video_stream_id herein.

An ID of the Dependent view video stream may be defined within the STN_table ( ), or may be found by calculations, by adding a predetermined value to the ID of the Base view video stream.

video_stream_number is a video stream number that is used to switch the video, and that can be seen by the user.

number_of_audio_stream_entries indicates the number of streams of the first audio stream to be entered in the STN_table ( ), wherein an audio_stream_id is provided. audio_stream_id is information to identify the audio stream, and audio_stream_number is an audio stream number that is used to switch the audio, and that can be seen by the user.

number_of_audio_stream2_entries indicates the number of streams of the second audio stream to be entered in the STN_table ( ), wherein an audio_stream_id2 is provided. audio_stream_id2 is information to identify the audio stream, and audio_stream_number is an audio stream number that is used to switch the audio, and that can be seen by the user. In this example, switching the audio to be played is enabled.

number_of_PG_txtST_stream_entries indicates the number of streams to be entered in the STN_table ( ), wherein a PG_txtST_stream_id is provided. A PG stream having a bit map caption subjected to run-length encoding and a text caption file (txtST) are entered herein. The PG_txtST_stream_id is information to identify the caption stream, and PG_txtST_stream_number is a caption stream number that is used to switch the captions, and that can be seen by the user.

number_of_IG_stream_entries indicates the number of streams to be entered in the STN_table ( ), wherein an IG_stream_id is provided. IG streams are entered herein. The IG_stream_id is information to identify the IG stream, and IG_stream_number is a graphics stream number that is used to switch the graphics, and that can be seen by the user.

IDs of the Main TS and Sub TS are also registered in the STN_table ( ). The fact that the ID thereof is a TS ID and not an elementary stream is described in the stream_attribute ( ).

[Specific Example of PlayList]

FIG. 17 is a diagram illustrating a specific example of the 3D_PlayList which is a PlayList for 3D playing.

For ease of description, a number and ":" indicating the row number is shown on the left side of FIG. 17. The number and ":" herein do not make up the 3D_Playlist.

The number_of_PlayItems in the second row corresponds to number_of_PlayItems in FIG. 12, and indicates the number of PlayItems in the 3D_PlayList. From the second row to the eighth row are descriptions relating to the PlayItems. That is to say, from the third row to the eighth row correspond to the PlayItem descriptions using the for sentence in FIG. 12.

The ref_to_B_clpi_file_name in the fifth row corresponds to Clip_Information_file_name [0] in FIG. 15, and indicates the five-digit number, excluding the extension ".m2ts", of the file name of the m2ts file storing the Base view video stream. With this description, the m2ts file to be referenced and the clpi file of the Base view video Clip are identified.

The type in the sixth row shows a Base view video and the type of array on the optical disc 202 of the D1/D2 view video data correlated thereto. type is set, using the reserved_for_future_use which follows the Clip_codec_identifier [0] in FIG. 15, for example.

FIG. 18 is a diagram showing the meaning of type.

That the value of type is 0 indicates that the Base view video, D1 view video, and D2 view video are not interleaved.

In this case, both of the existing D1/D2 view videos or one of the packets are multiplexed to one MPEG2-TS along with the Base view video packet.

That the value of type is 1 indicates that the Base view video, D1 view video, and D2 view video are all interleaved.

In this case, three TSs of a first TS that includes the B view video, a second TS that includes the D1 view video, and a third TS that includes the D2 view video are interleaved on the optical disc 202 in increments of extents.

The fact that the value of type is 2 indicates that the Base view video and D1 view video are interleaved.

In this case, two TSs of a first TS that includes the B view video and a second TS that includes the D1 view video packet are interleaved on the optical disc 202 in increments of extents. The D2 view video packet may be multiplexed in the first TS. Also, the D2 view video packet may be multiplexed in the second TS.

The fact that the value of type is 3 indicates that the Base view video and D2 view video are interleaved.

In this case, two TSs of a first TS that includes the B view video packet and a second TS that includes the D2 view video packet are interleaved on the optical disc 202 in increments of extents. The D1 view video packet may be multiplexed in the first TS. Also, the D1 view video packet may not be multiplexed in the second TS.

Returning to the description in FIG. 17, the STN_table in the seventh row corresponds to the STN_table ( ) in FIG. 15. As described with reference to FIG. 16, the ID of each stream to be referenced in the 3D_PlayList is described in the STN_table.

The number_of_SubPaths in the ninth row corresponds to the number_of_SubPaths in FIG. 12, and indicates the number of SubPaths in the 3D_PlayList. From the ninth row to the fourteenth row are descriptions relating to the SubPath. That is to say, from the tenth row to the fourteenth row correspond to descriptions of the SubPath using a for-sentence in FIG. 12.

The SubPath_type in the twelfth row corresponds to the SubPath_type in FIG. 13, and shows the type of SubPath.

FIG. 19 is a diagram showing the meaning of the SubPath_type.

To describe what is primary of the various values shown in FIG. 19, the fact that the value of SubPath_type is 8 indicates that this is a Sub Path that plays the D2 view video.

Also, the fact that the value of the SubPath_type is 9 indicates that this is a Sub Path that plays the D1 view video.

The ref_to_clpi_file_name in the thirteenth row in FIG. 17 corresponds to the Clip_Information_file_name [0] in FIG. 14.

In the case that the SubPath plays the D1 view video, the ref_to_clpi_file_name indicates the five-digit number, excluding the ".m2ts" extension, of the file name of the m2ts file storing the D1 view video. With this description, the clpi file to be referenced is identified.

On the other hand, in the case that the SubPath2 plays the D2 view video, the ref_to_clpi_file_name in the thirteenth row indicates the five-digit number, excluding the ".m2ts" extension, of the file name of the m2ts file storing the D2 view video.

From the sixteenth row to the thirtieth row, this is description relating to interleaved_file_info ( ), i.e., an ilvt file. For example, description relating to an ilvt file is prepared, using reserved_for_future_use in the PlayItem ( ) and SubPath ( ).

From the seventeenth row to the twenty-second row, this is description in the case that the value of the type in the sixth row is 1 and that the Base view video, D1 view video, and D2 view video are all interleaved.

The ref_to_D1-B_interleaved_file_name in the eighteenth row indicates the five-digit number, excluding the ".ilvt" extension, of the file name of the ilvt file for playing the Base view video and D1 view video.

The ref_to_D2-B_interleaved_file_name in the nineteenth row indicates the five-digit number, excluding the ".ilvt" extension, of the file name of the ilvt file for playing the Base view video and D2 view video.

The ref_to_D1_clpi_file_name in the twentieth row indicates the five-digit number, excluding the ".m2ts" extension, of the file name of the m2ts file storing the D1 view vide. With this description, the clpi file to be referenced at the time of playing the m2ts file of the D1 view vide is identified.

The ref_to_D2_clpi_file_name in the twenty-first row indicates the five-digit number, excluding the ".m2ts" extension, of the file name of the m2ts file storing the D2 view vide. With this description, the clpi file to be referenced at the time of playing the m2ts file of the D2 view vide is identified.

From the twenty-third row to the twenty-sixth row, this is description to be referenced in the case that the value of type in the sixth row is 2, and the Base view video and D1 view video are interleaved.

The ref_to_D1-B_interleaved_file_name in the twenty-fourth row indicates the five-digit number, excluding the ".ilvt" extension, of the file name of the ilvt file for playing the Base view video and D1 view video.

The ref_to_D1_clpi_file_name in the twenty-fifth row indicates the five-digit number, excluding the ".m2ts" extension, of the file name of the m2ts file storing the D1 view vide. With this description, the clpi file to be referenced at the time of playing the m2ts file of the D1 view vide is identified.

From the twenty-seventh row to the thirtieth row, this is description to be referenced in the case that the value of type in the sixth row is 3, and the Base view video and D2 view video are interleaved.

The ref_to_D1-B_interleaved_file_name in the twenty-eighth row indicates the five-digit number, excluding the ".ilvt" extension, of the file name of the ilvt file for playing the Base view video and D2 view video.

The ref_to_D2_clpi_file_name in the twenty-ninth row indicates the five-digit number, excluding the ".m2ts" extension, of the file name of the m2ts file storing the D2 view vide. With this description, the clpi file to be referenced at the time of playing the m2ts file of the D2 view vide is identified.

Thus, in the case that the data is interleaved on the optical disc 202, information is described in the 3D_PlayList wherein the file name of the clpi file corresponding to the Clip AV stream can be identified for the D1 view video and D2 view video also.

[Configuration Example of Playing Device 201]

FIG. 20 is a block diagram showing a configuration example of the playing device 201.

The controller 251 executes a control program that is prepared beforehand, and controls the overall operations of the playing device 201.

For example, the controller 251 controls a disk drive 252 to read out a PlayList file for 3D playing. Also the controller 251 causes the Main TS and SubTS to be read out, based on the IDs registered in the STN_table, and supplies these to the decoder unit 256.

The disk drive 252 reads out data from the optical disc 202 under control of the controller 251, and outputs the read out data to the controller 251, memory 253, or decoding unit 256.

The memory 253 stores data and so forth necessary for the controller 251 to execute various types of processing, as appropriate.

A local storage 254 is made up of an HDD (Hard Disk Drive), for example. D1/D2 view video streams and so forth that are downloaded from a server 272 are recorded in the local storage 254. The streams recorded in the local storage 254 are also supplied to the decoder unit 256 as appropriate.

An internet interface 255 performs communication with the server 272 via a network 271 under control of the controller 251, and supplies the data downloaded from the server 272 to the local storage 254.

From the server 272, data to update the data recorded on the optical disc 202 is downloaded. The downloaded D1/D2 view video streams can be used along with the Base view video streams recorded on the optical disc 202, whereby 3D playing of content differing from the content on the optical disc 202 can be realized. When the D1/D2 view video streams are downloaded, the content of the PlayList is also updated as appropriate.

The decoder unit 256 decodes the streams supplied from the disk drive 252 or local storage 254, and outputs the obtained video signal to the display device 203. The audio signal is also output to the display device 203 via a predetermined path.

The operating input unit 257 is made up of input devices such as buttons, keys, touch panel, jog dial, mouse, and so forth, and a receiving unit to receive signals such as infrared rays that are transmitted from a predetermined remote commander. The operating input unit 257 detects user operations, and supplies the signals showing the detected operating content to the controller 251.

Figure 21:
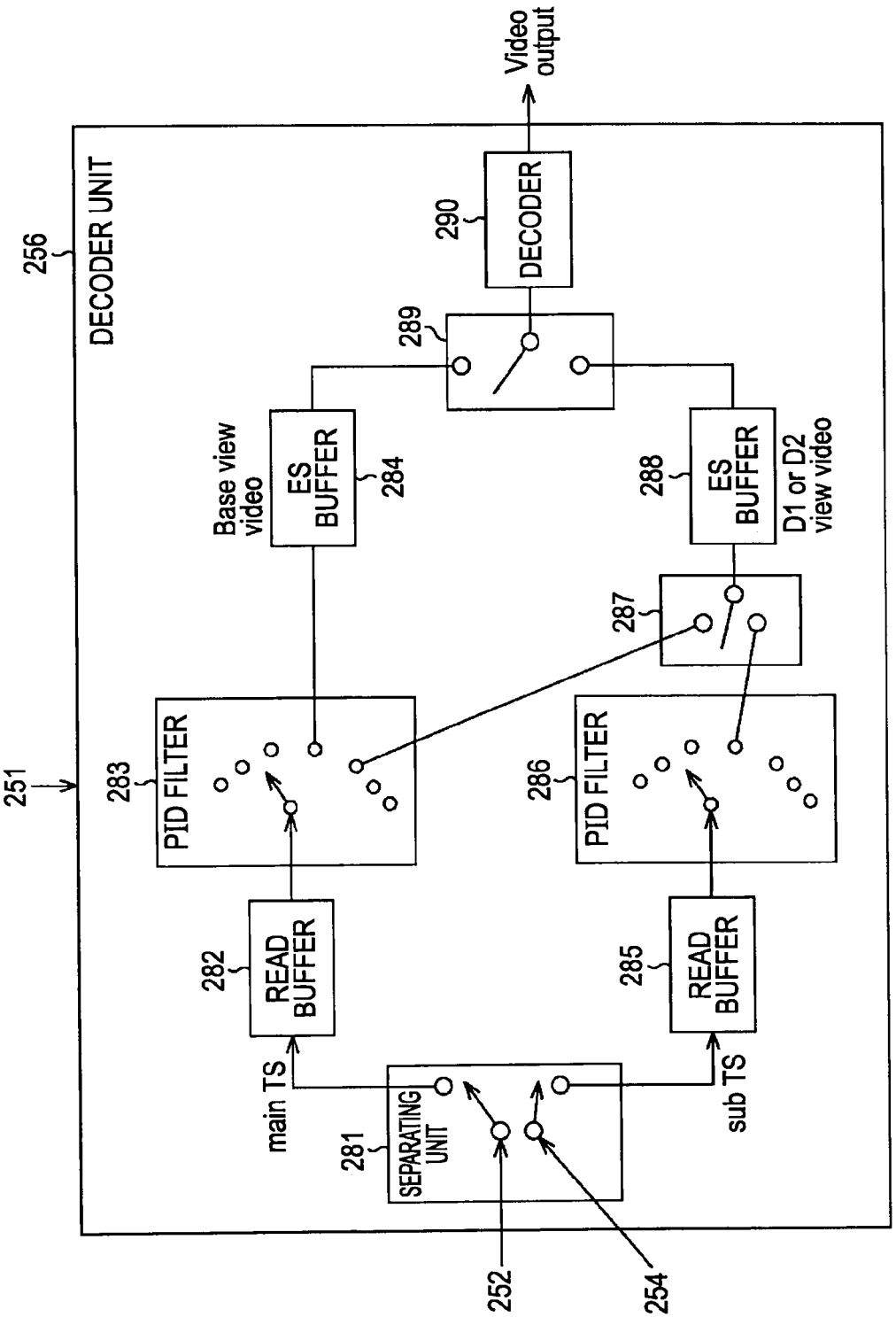
FIG. 21 is a diagram illustrating a configuration example of the decoder unit in FIG. 20.

FIG. 21 is a diagram showing a configuration example of the decoder unit 256.

A separating unit 281 separates the data supplied from the disk drive 252 under control of by the controller 251 into data of packets making up the Main TS and data of packets making up the Sub TS. For example, the TS read out from the optical disc 202 is supplied to the separating unit 281 based on the stream IDs described in the STN_table ( ) of the 3D PlayList file.

The separating unit 281 outputs and stores the separated packets making up the Main TS in the read buffer 282, and outputs and stores the packets making up the Sub TS in the read buffer 285.

Also, the separating unit 281 outputs and stores the packets making up the Sub TS supplied from the local storage 254 to the read buffer 285.

As described above, there are cases wherein the D1/D2 view vide downloaded from the server 272 are stored in the local storage 254. When instructed to play along with the Base view video recorded on the optical disc 202, the D1/D2 view vide streams serving as Sub TS are read out from the local storage 254 and supplied to the separating unit 281.

A PID filter 283 assigns the packets making up the Main TS stored in the read buffer 282, based on the PID set in each packet. The PIDs of the packets making up the Base view video, the PIDs of the packets making up the D1 view video, and the PIDs of the packets making up the D2 view video are each specified by the controller 251.

The PID filter 283 reads out the Base view video packets included in the Main TS from the read buffer 282, and outputs and stores this in an ES buffer 284. An ES (Elementary Stream) made up of Base view video packets is stored in the ES buffer 284.

Also, in the case that the D1/D2 view vide packets are multiplexed in the Main TS, the packets thereof are extracted based on the PIDs, and output to a switch 287.

The PID filter 286 reads out the D1/D2 view vide packets included in the Sub TS from the read buffer 285, and outputs this to the switch 287.

Note that processing for only the Base view video and D1/D2 view video are described, but as described with reference to FIG. 5, graphics data such as PG and IG may be multiplexed to the Main TS. Similarly, as described with reference to FIG. 6, subtitle data and graphics data other than the D1/D2 view vide may be multiplexed also to the Sub TS.

The PID filter 283 and PID filter 286 appropriately assign the data thereof based on the PID, and outputs this to predetermined output destinations. A decoder to decode graphics data or the like is connected to an output destination terminal (circle) shown in the block of the PID filter 283 and PID filter 286 in FIG. 21.

The switch 287 outputs and stores the D1/D2 view vide packets supplied from the PID filter 283 to the ES buffer 288. Also, the switch 287 outputs and stores the D1/D2 view vide packets supplied from the PID filter 286 in the ES buffer 288. ES made up of D1/D2 view video packets are stored in the ES buffer 288.

The switch 289 outputs the Base view video packets stored in the ES buffer 284, and the packets to be subjected to decoding within the D1/D2 view video packets stored in the ES buffer 288, to the decoder 290. Point-in-time information such as DTS (Decoding Time Stamp) is set in a PES packet of the Base view video and D1/D2 view video, and readout is performed from the buffer based on the point-in-time information thereof.

The video decoder 290 decodes the packets supplied from the switch 289, and outputs the data of the Base view video or D1/D2 view video obtained by decoding.

[Example 1 of 3D_PlayList]

FIG. 22 is a diagram showing an example of the 3D_PlayList.

The 3D_PlayList described in the "00000.mpls" PlayList file in FIG. 22 is a PlayList that manages the playing of the optical disc 202 wherein the Base view video, D1 view video, and D2 view video are all interleaved. That is to say, the value of type is 1.

In the example of FIG. 22, the ref_to_B_clpi_file_name of the PlayItem ( ) is "00001". From this description, in the case of playing "00001.m2ts" which is a Base view video m2ts file, referencing the "00001.clpi" clpi file in FIG. 10 is identified.

Also, the SubPath_type of SubPath ( ) [1] is "9". The fact that the SubPath_type is "9" indicates that the first SubPath herein is a Sub Path to play the D2 view video.

The ref_to_clpi_file_name of SubPath ( ) [1] is "00002". From this description, in the case of playing the D2 view video, referencing the "00002.clpi" clpi file in FIG. 10 is identified.

The SubPath_type of SubPath ( ) [2] is "8". That the SubPath_type is "8" indicates that the second SubPath herein is a Sub Path to play the D1 view video.

The ref_to_clpi_file_name of SubPath ( ) [2] is "00003". From this description, in the case of playing the D1 view video, referencing the "00003.clpi" clpi file in FIG. 10 is identified.

The ref_to_D1-B_interleaved_file_name of the interleaved_file_info ( ) is "10000". From this description, in the case of performing D1-B playing, referencing the "10000.ilvt" ilvt file in FIG. 10 is identified.

Also, the ref_to_D2-B_interleaved_file_name of the interleaved_file_info ( ) is "20000". From this description, in the case of performing D2-B playing, referencing the "20000.ilvt" ilvt file in FIG. 10 is identified.

The ref_to_D1_clpi_file_name is "00003". From this description, in the case of playing the D1 view video, referencing the "00003.clpi" clpi file in FIG. 10 is identified.

The ref_to_D2_clpi_file_name is "00002". From this description, in the case of playing the D2 view video, referencing the "00002.clpi" clpi file in FIG. 10 is identified.

FIG. 23 is a diagram showing the syntax of the clpi file used along with the 3D_PlayList in FIG. 22.

A in FIG. 23 is a diagram showing an example of a "00001.clpi" clpi file. As described above, the "00001.clpi" clpi file is a file to be referenced in the case of playing "00001.m2ts" which is a Base view video m2ts file.

number_of_source_packets1 indicates the number of source packets included in the "00001.m2ts" m2ts file.

EP_map indicates position information of an entry point (EP) within the TS included in the "00001.m2ts" m2ts file.

chunk_map ( ) indicates a Source Packet Number (SPN) indicating the starting position for each chunk, in order from the head chunk, for the TS included in the "00001.m2ts" m2ts file.

A chunk belongs to one TS, and is a collection of Source packets that are arrayed continuously on the optical disc 202. Now, description will be given as one chunk being applicable to one extent arrayed on the optical disc 202.

chunk_map ( ) indicates the length of each chunk. A specific example of the chunk_map ( ) will be described later.

B in FIG. 23 is a diagram showing an example of a "00002.clpi" clpi file. The "00002.clpi" clpi file is a file to be referenced in the case of playing the D2 view video.

C in FIG. 23 is a diagram showing an example of a "00003.clpi" clpi file. The "00003.clpi" clpi file is a file to reference in the case of playing the D1 view video. The description content of B in FIG. 23 and C in FIG. 23 are the same as shown in A in FIG. 23.

Figure 24:
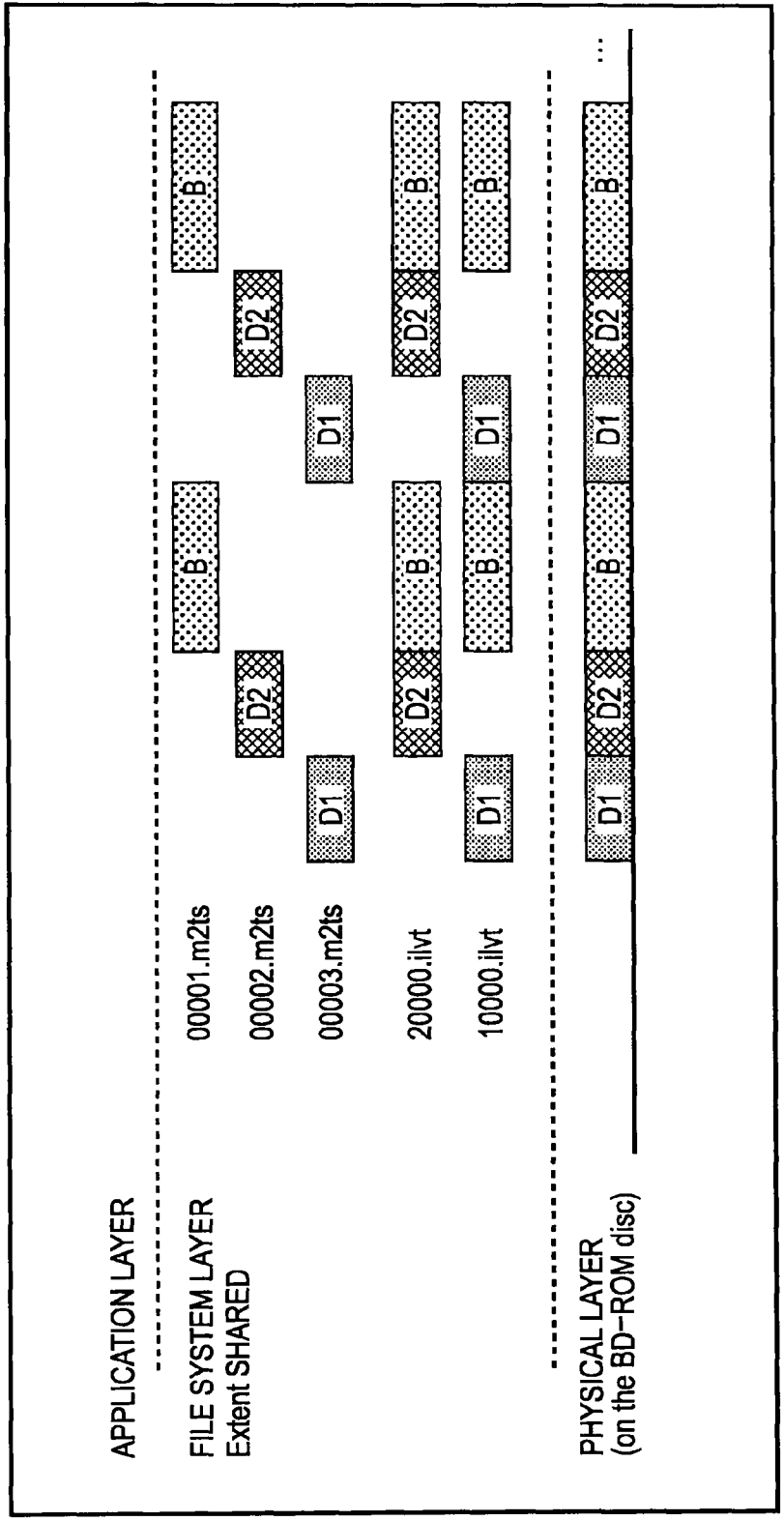
FIG. 24 is a diagram illustrating a concept of file management that is performed using the data in FIG. 22 and FIG. 23.

FIG. 24 is a diagram showing a concept of file managing that is performed using the data in FIG. 22 and FIG. 23.

As shown in FIG. 24, file managing is performed in a form of a three-layer configuration of a physical layer, file system layer, and application layer. The 3D_PlayList in FIG. 22 and the clpi file in FIG. 23 are the application layer information.

The physical layer is the layer of the optical disc 202 wherein the Base view video, D1 view video, and D2 view video are all recorded in a state of being interleaved.

With the example in FIG. 24, a D1 view video chunk, D2 view video chunk, and Base view video chunk are arrayed in the order thereof. In FIG. 24, the block denoted by the letter "B" indicates the Base view video chunk, the block denoted by the letter "D1" indicates the D1 view video chunk, and the block denoted by the letter "D2" indicates the D2 view video chunk.

Thus, the extents (chunks) of the Base view video, D1 view video, and D2 view video are arrayed so as to be interleaved on the optical disc 202. Interleaving array means a cyclic array wherein extents from the same type of stream are not adjacent.

In the file system layer, a stream file (m2ts file, ilvt file) specified by the application with a file name and the various chunks on the optical disc 202 are correlated. The file system is a UDF file system, for example.

As shown in FIG. 24, the "00001.m2ts" m2ts file is made up of Base view video chunks arrayed on the optical disc 202.

Also, the "00002.m2ts" m2ts file is made up of D2 view video chunks arrayed on the optical disc 202.

The "00003.m2ts" m2ts file is made up of D1 view video chunks arrayed on the optical disc 202.

The "20000.ilvt" file is made up of D2 view video chunks and Base view video chunks arrayed on the optical disc 202.

The "10000.ilvt" file is made up of D1 view video chunks and Base view video chunks arrayed on the optical disc 202.

In the case that "00001.m2ts" is specified by the application and data readout is instructed in order to perform 2D playing, the Base view video chunk is read out in accordance with the managing by the file system.

Also, in the case that "10000.ilvt" is specified by the application and data readout is instructed in order to perform B-D1 playing, the D1 view video chunk and Base view video chunk are read out in accordance with the managing by the file system.

In the case that "20000.ilvt" is specified by the application and data readout is instructed in order to perform B-2D playing, the D2 view video chunk and Base view video chunk are read out in accordance with the managing by the file system.

Operating Example 1

Figure 25:
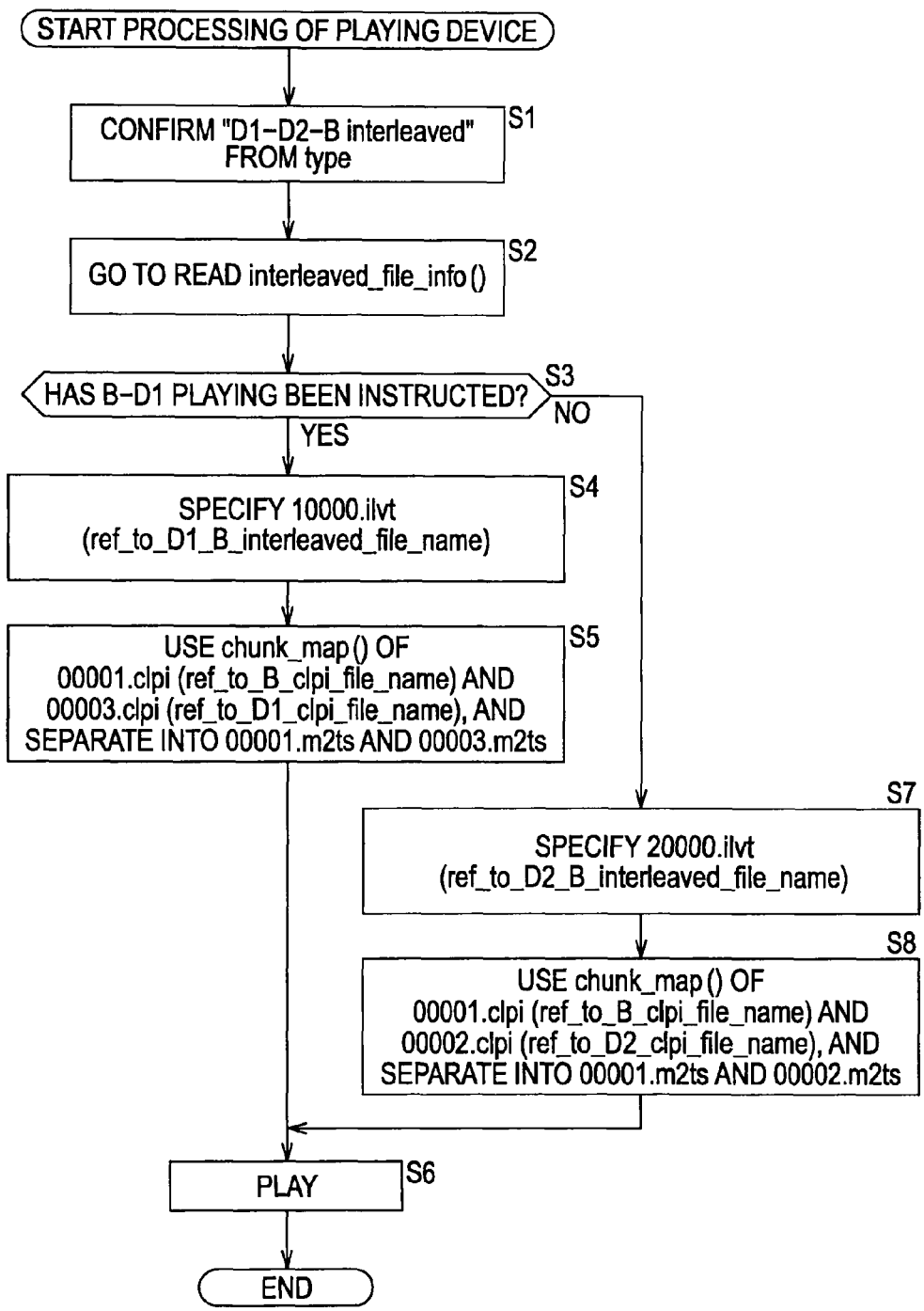
FIG. 25 is a flowchart describing playing processing that is performed according to the 3D_PlayList file in FIG. 22.

Now, playing processing that is performed in accordance with the 3D_PlayList file in FIG. 22 will be described with reference to the flowchart in FIG. 25.

In step S1, the controller 251 confirms from the value of the type, that the Base view video, D1 view video, and D2 view video are all interleaved.

In this case, in step S2, the control 251 goes to read interleaved_file_info ( ).

In step S3, the controller 251 determines whether or not B-D1 playing has been instructed, based on user operations and so forth.

In the case determination is made in step S3 that B-D1 playing has been instructed, in step S4 the controller 251 specifies "10000.ilvt" (ref_to_D1-B_interleaved_file_name) described in the interleaved_file_info ( ), and causes a Base view video chunk and D1 view video chunk to be read out from the optical disc 202 through the UDF file system.

The Base view video chunk and D1 view video chunk that have been read out by the disk drive 252 are supplied to the separating unit 281 of the decoder unit 256.

In Step S5, the separating unit 281 separates the supplied data into "00001.m2ts" m2ts file data and "00003.m2ts" m2ts file data, based on the chunk_map ( ) of the "00001.clpi" (ref_to_B_clpi_file_name) and the chunk_map ( ) of the "00003.clpi" (ref_to_D1_clpi_file_name) in FIG. 23. The separating unit 281 outputs the "00001.m2ts" m2ts file data to the read buffer 282, and outputs the "00003.m2ts" m2ts file data to the read buffer 285. Separation of data performed using the chunk_map ( ) will be described later.

The "00001.m2ts" m2ts file data stored in the read buffer 282 is supplied to a decoder 290 via the PID filter 283, ES buffer 284, and switch 289. The "00003.m2ts" m2ts file data stored in the read buffer 285 is supplied to the decoder 290 via the PID filter 286, switch 287, ES buffer 288, and switch 289.

In step S6, the decoder 290 decodes (plays) packets that are sequentially supplied from the switch 289.

On the other hand, in the case that determination is made in step S3 that B-D1 playing is has not been instructed, i.e., in the case that determination is made that B-D2 playing has been instructed, in step S7 the controller 251 specifies "20000.ilvt" (ref_to_D2-B_interleaved_file_name) described in the interleaved_file_info ( ), and causes a Base view video chunk and D2 view video chunk to be read out from the optical disc 202 through the UDF file system.

In step S8, the separating unit 281 separates the supplied data into "00001.m2ts" m2ts file data and "00002.m2ts" m2ts file data, based on the chunk_map ( ) of the "00001.clpi" (ref_to_B_clpi_file_name) and the chunk_map ( ) of the "00002.clpi" (ref_to_D2_clpi_file_name). The separating unit 281 outputs the "00001.m2ts" m2ts file data to the read buffer 282, and outputs the "00002.m2ts" m2ts file data to the read buffer 285.

Thereafter, the "00001.m2ts" m2ts file data and the "00002.m2ts" m2ts file data is supplied to the decoder 290, similar to at the time of B-D1 playing, and is played in step S6.

[Data Separation Using chunk_map ( )]

FIG. 26 is a diagram showing an example of the syntax of a chunk_map ( ).

number_of_chunks indicates the number of chunks to be referenced. After the number_of_chunks, chunk information for only the number specified here is described.

SPN_chunk_start [i] indicates the SPN (length), with the starting position of the head chunk as a base, for example, from the position of the base thereof to the starting position of each chunk. The SPN to the starting position of each chunk is described in order from the head chunk.

FIG. 27 is a diagram showing a specific example of a chunk_map ( ).

A in FIG. 27 is a chunk_map ( ) described in the "00001.clpi" clpi file, wherein number_of_chunks is (n+1).

Also, SPN_chunk_start [i] is 0, c1, c2, . . . , cn.

Figure 28:
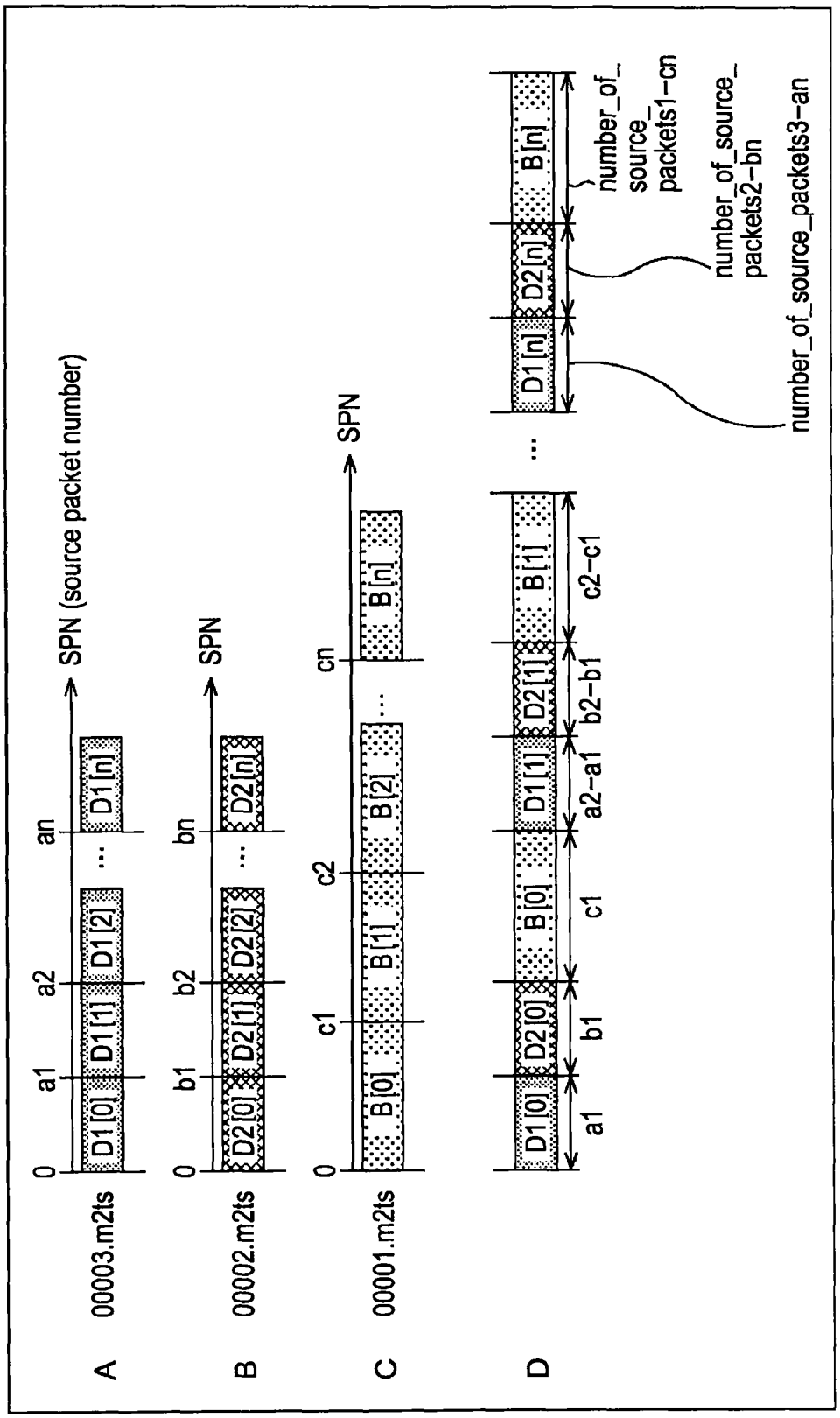
FIG. 28 is a diagram illustrating the separation of a chunk.

The first value 0, as shown in C in FIG. 28, indicates that the SPN is 0, with the starting position of the head chunk of the Base view video included in the "00001.m2ts" m2ts file as a base, from the position of the base thereof to the starting position of the first chunk (B[0]).

The second value c1 indicates that the SPN from the base position to the starting position of the second chunk (B[1]) is c1.

The third value c2 indicates that the SPN from the base position to the starting position of the third chunk (B[2]) is c2.

The n+1'th value cn indicates the SPN from the base position to the starting position of the n+1'th chunk (B[n]) which is the last chunk is cn.

B in FIG. 27 is a chunk_map ( ) described in the "00002.clpi" clpi file, wherein number_of_chunks is (n+1).

Also, SPN_chunk_start [i] is 0, b1, b2, . . . , bn.

The first value 0, as shown in B in FIG. 28, indicates that the SPN is 0, with the starting position of the head chunk of the D2 view video included in the "00002.m2ts" m2ts file as a base, from the position of the base thereof to the starting position of the first chunk (D2[0]).

The second value b1 indicates that the SPN from the base position to the starting position of the second chunk (D2[1]) is b1.

The third value b2 indicates that the SPN from the base position to the starting position of the third chunk (D2[2]) is b2.

The n+1'th value bn indicates the SPN from the base position to the starting position of the n+1'th chunk (D2[n]) which is the last chunk is bn.

C in FIG. 27 is a chunk_map ( ) described in the "00003.clpi" clpi file, wherein number_of_chunks is (n+1).

Also, SPN_chunk_start [i] is 0, a1, a2, . . . , an.

The first value 0, as shown in A in FIG. 28, indicates that the SPN is 0, with the starting position of the head chunk of the D1 view video included in the "00003.m2ts" m2ts file as a base, from the position of the base thereof to the starting position of the first chunk (D1[0]).

The second value a1 indicates that the SPN from the base position to the starting position of the second chunk (D1[1]) is a1.

The third value a2 indicates that the SPN from the base position to the starting position of the third chunk (D1[2]) is a2.

The n+1'th value an indicates the SPN from the base position to the starting position of the n+1'th chunk (D1[n]) which is the last chunk is an.

D1[i], D2[i], and B[i] are arrayed cyclically on the optical disc 202 in the order shown in D of FIG. 28.

In the case that the data read out from the optical disc 202 is supplied from the disk drive 252, the separating unit 281 separates the data of SPN worth that equates to a1 from the head of the supplied data as D1[0], based on the description of three chunk_map ( ) in FIG. 27.

Also, the separating unit 281 separates SPN worth of data equivalent to b1 from the position at the end of D1[0] as D2[0], and separates SPN worth of data equivalent to c1 from the position at the end of D2[0] as B[0].

The separating unit 281 separates SPN worth of data equivalent to a2-a1 from the position at the end of B[0] as D1[1].

The separating unit 281 separates SPN worth of data equivalent to b2-b1 from the position at the end of D1[1] as D2[1], and separates SPN worth of data equivalent to c2-c1 from the position at the end of D2[1] as B[1].

Note that the chunks to be subject to separating are only D1[i] and B[i] in the case of performing B-D1 playing, and are only D2[i], B[i] in the case performing B-D2.

Thus, the data separation by the separating unit 281 is performed using information of the length of each chunk described in the chunk_map ( ).

chunk_map ( ) will be given supplemental description.

When the type=0, chunk_map ( ) is optional (not needed) for a clpi file to be referenced by ref_to_B_clpi file_name. In the case that there is a chunk_map ( ), the player must ignore the chunk_map ( ) thereof.

Also, chunk_map ( ) is optional (not needed) for a clpi file corresponding to an m2ts file on the local storage 254. In the case there is a chunk_map ( ), the player must ignore the chunk_map ( ) thereof.

When the type=1, the corresponding three TSs of Base view video TS, D1 view video TS, and D2 view video TS are each divided in chunks of the same number (n+1) respectively. That is to say, for D1[i], D2[i], and B[i] in FIG. 28, chunks of a pair having the same value of index i are divided so as to have the same playing time.

Similarly, when the type=2, the corresponding two TSs of Base view video TS and D1 view video TS are each divided in chunks of the same number (n+1) respectively. That is to say, for interleaved D1[i], B[i], chunks of a pair having the same value of index i are divided so as to have the same playing time.

When the type=3, the corresponding two TSs of Base view video TS and D2 view video TS are each divided in chunks of the same number (n+1) respectively. That is to say, for interleaved D2[i], B[i], chunks of a pair having the same value of index i are divided so as to have the same playing time.

[Example 2 of 3D_PlayList]

FIG. 29 is a diagram showing another example of the 3D_PlayList.

The 3D_PlayList described in the PlayList file of "0000.mpls" in FIG. 29 is a PlayList managing the playing of the optical disc 202 wherein Base view video and D2 view video are interleaved. That is to say, the value of the type is 3.

Except for the point wherein the description of SubPath is only the description of subPath referencing D2 view video and the point that the descriptions of interleaved_file_info ( ) differs, the description of the 3D_PlayList in FIG. 29 is similar to the description in FIG. 22.

That is to say, the SubPath_type of the SubPath ( ) is "9". The fact that the SubPath_type is "9" indicates that the Sub-Path herein is a sub path playing the D2 view video.

Also, the ref_to_clpi_file_name is "00002".

ref_to_D2-B_interleaved_file_name of the interleaved_file_info ( ) in FIG. 29 is "20000". From this description, in the case of performing D2-B playing, referencing the "20000.ilvt" ilvt file in FIG. 10 is identified.

Also, ref_to_D2_clpi_file_name is "00002". From this description, in the case of performing playing the D2 view video, referencing the "00002.clpi" clpi file in FIG. 10 is identified.

Figure 30:
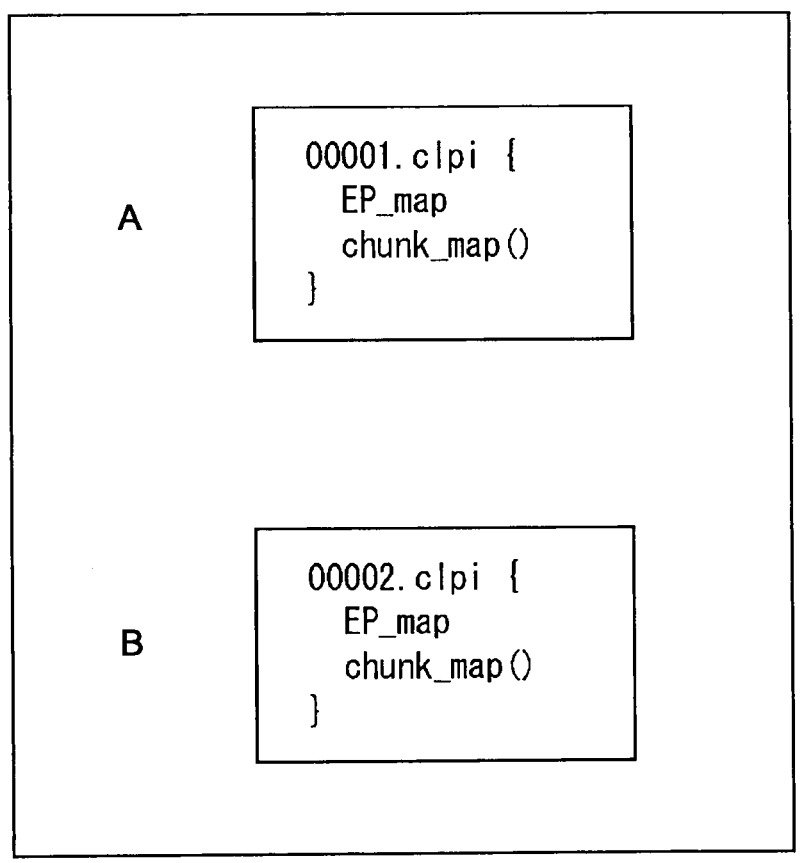
FIG. 30 is a diagram illustrating the syntax of a clpi file.

FIG. 30 is a diagram showing the syntax of a clpi file that is used along with the 3D_PlayList in FIG. 29.

A in FIG. 30 is a diagram showing an example of a "00001.clpi" clpi file, and B in FIG. 30 is a diagram showing an example of a "00002.clpi" clpi file. In either clpi file, an EP_map and the above-described chunk_map ( ) description are included.

Figure 31:
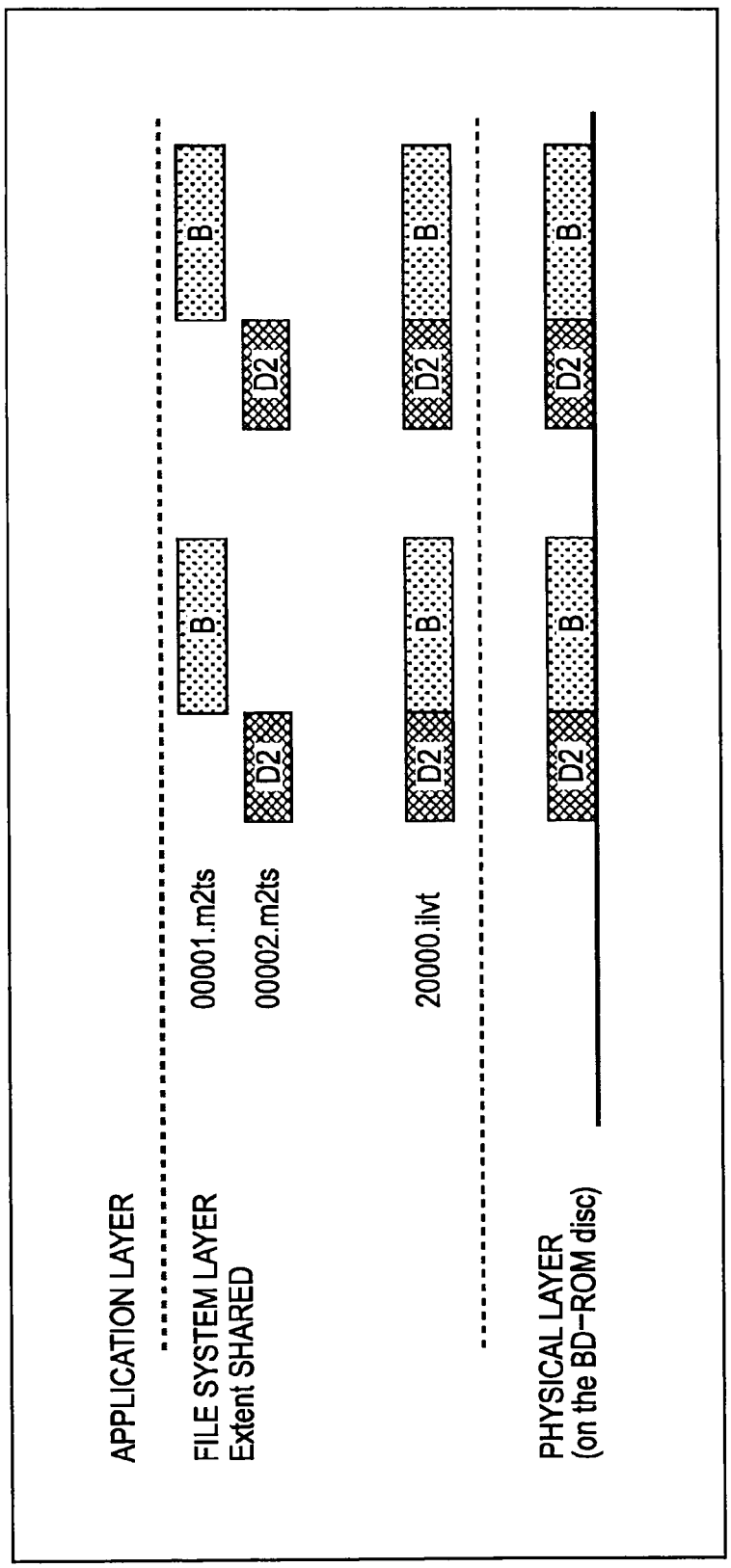
FIG. 31 is a diagram illustrating a concept of file management that is performed using the data in FIG. 29 and FIG. 30.

FIG. 31 is a diagram showing a concept of file managing that is performed using the data in FIG. 29 and FIG. 30.

As illustrated in FIG. 31, the physical layer is a layer of the optical disc 202 wherein the Base view video and D2 view video are recorded in an interleaved state.

The "00001.m2ts" m2ts file is made up of Base view video chunks arrayed on the optical disc 202.

Also, the "00002.m2ts" m2ts file is made up of D2 view video chunks arrayed on the optical disc 202.

The "20000.ilvt" ilvt file is made up of D2 view video chunks and Base view video chunks arrayed on the optical disc 202.

In the case that "00001.m2ts" is specified by the application and data readout is instructed in order to perform 2D playing, the Base view video chunk is read out in accordance with the managing by the file system.

In the case that "20000.ilvt" is specified by the application and data readout is instructed in order to perform B-2D playing, the D2 view video chunk and Base view video chunk are read out in accordance with the managing by the file system.

Operating Example 2

Figure 32:
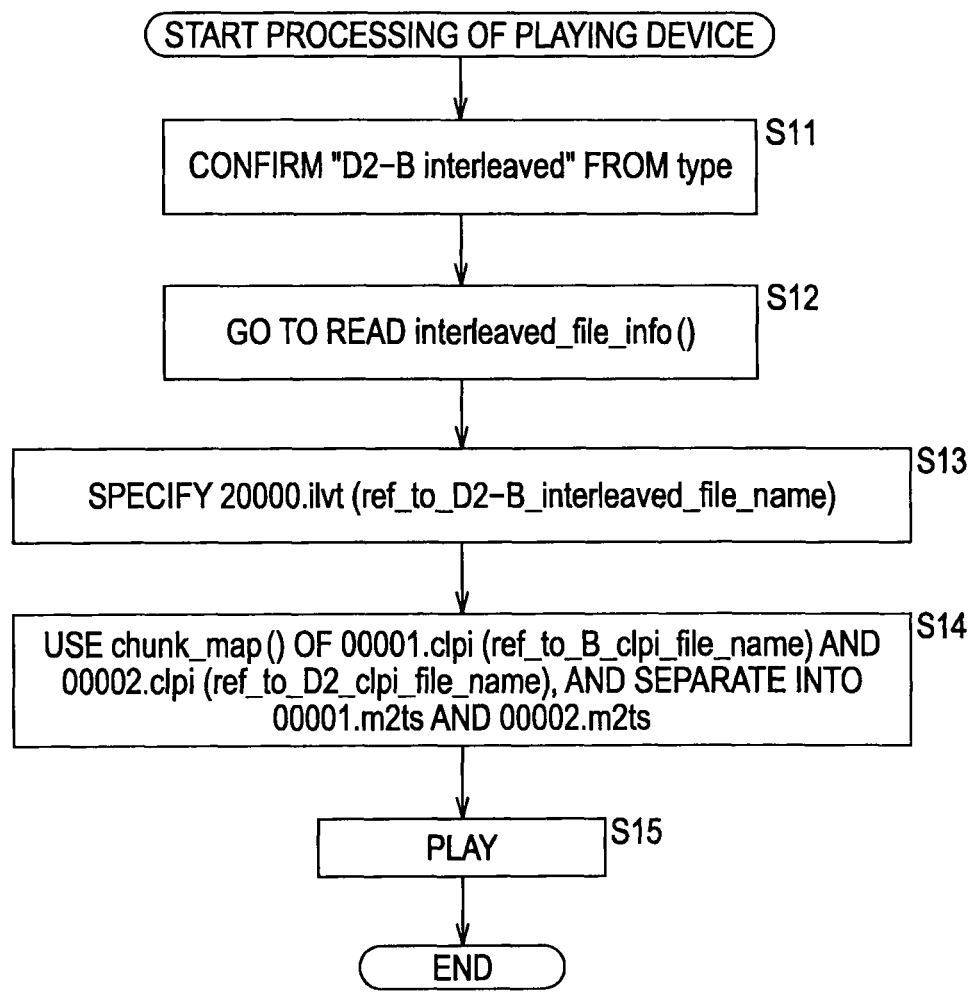
FIG. 32 is a flowchart describing playing processing that is performed according to the 3D_PlayList file in FIG. 29.

Playing processing that is performed according to the 3D_PlayList file in FIG. 29 will be described with reference to the flowchart in FIG. 32.

In step S11, the controller 251 confirms from the value of the type that the Base view video and D2 view video are interleaved.

In this case, in step S12 the controller 251 goes to read the interleaved_file_info ( ).

In the case that B-D2 playing has been instructed, in step S13 the controller 251 specifies the "20000.ilvt" (ref_to_D2-B_interleaved_file_name) described in the interleaved_file_info ( ), and causes the Base view video chunks and D2 view video chunks to be read out from the optical disc 202.

The Base view video chunks and D2 view video chunks read out by the disk drive 252 are supplied to the separating unit 281 of the decoder unit 256.

In step S14, the separating unit 281 separates the supplied data into "00001.m2ts" m2ts file data and "00002.m2ts" m2ts file data, based on the chunk_map ( ) of the "00001.clpi" (ref_to_B_clpi_file_name) and the chunk_map ( ) of the "00002.clpi" (ref_to_D2_clpi_file_name). The separating unit 281 outputs the "00001.m2ts" m2ts file data to the read buffer 282, and outputs the "00002.m2ts" m2ts file data to the read buffer 285.

The "00001.m2ts" m2ts file data stored in the read buffer 282 is supplied to the decoder 290, via the PID filter 283, ES buffer 284, and switch 289. On the other hand, the data of the "00002.m2ts" m2ts file stored in the read buffer 285 is supplied to the decoder 290 via the PID filter 286, switch 287, ES buffer 288, and switch 289.

In step S15, the decoder 290 decodes the packets supplied sequentially from the switch 289.

[Example 3 of the 3D_PlayList]

FIG. 33 is a diagram showing yet another example of the 3D_PlayList.

The 3D_PlayList described in the PlayList file "00000.mpls" in FIG. 33 is a PlayList to manage the playing of the Base view video and D2 view video recorded on the optical disc 202 and the D1 view video recorded on the local storage 254. On the optical disc 202, the Base view video and D2 view video are interleaved.

The value of type of the PlayItem ( ) is 3, since this indicates the type of data array on the optical disc 202.

The SubPath_type of SubPath ( ) [1] is "9". That the Sub-Path_type is "9" indicates that the first SubPath herein is a Sub Path to play the D2 view video.

The ref_to_clpi_file_name of SubPath ( ) [1] is "00002". From this description, in the case of playing the D2 view video, referencing the "00002.clpi" clpi file in FIG. 10 is identified.

The SubPath_type of SubPath ( ) [2] is "8". That the Sub-Path_type is "8" indicates that the second SubPath herein is a Sub Path to play the D1 view video.

The ref_to_clpi_file_name of SubPath ( ) [2] is "00003". From this description, in the case of playing the D1 view video, referencing the "00003.clpi" clpi file recorded in the local storage 254 is identified.

Description relating to the second SubPath herein is added when the D1 view video is downloaded.

The ref_to_D2-B_interleaved_file_name of the interleaved_file_info ( ) is "20000". From this description, in the case of performing B-D2 playing, referencing the "20000.ilvt" ilvt file in FIG. 10 is identified.

Also, the ref_to_D2_clpi_file_name is "00002". From this description, in the case of playing the D2 view video, referencing the "00002.clpi" clpi file in FIG. 10 is identified.

Note that on the local storage 254, the D1 view video is not interleaved, whereby an ilvt file relating to the D1 view video is not needed.

Figure 34:
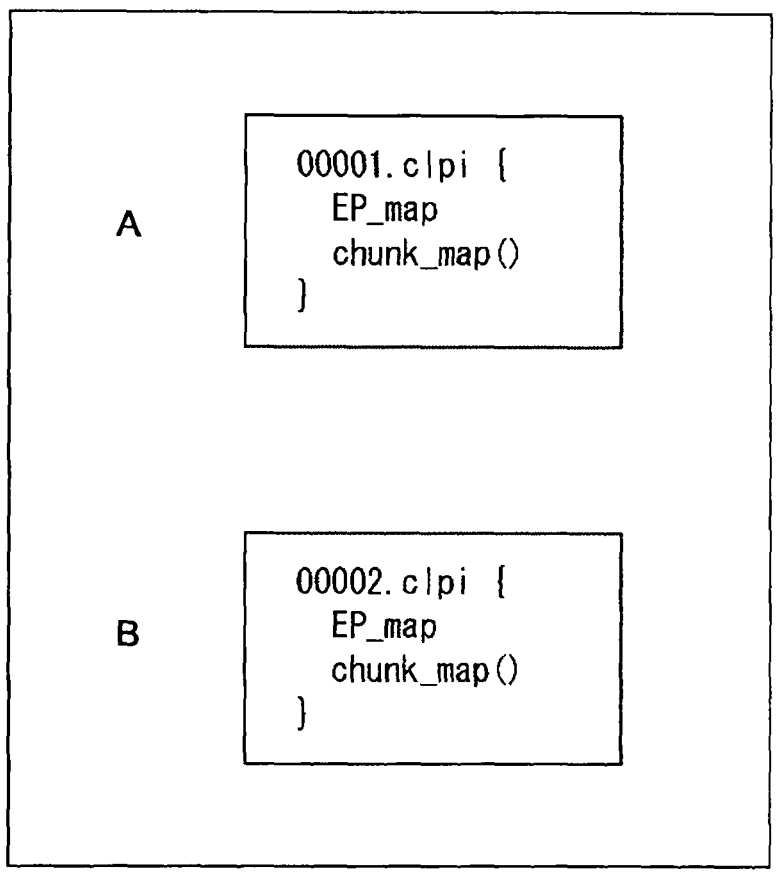
FIG. 34 is a diagram illustrating the syntax of a clpi file.

FIG. 34 is a diagram showing syntax of the clpi file used along with the 3D_PlayList in FIG. 33.

A in FIG. 34 is a diagram showing an example of a "00001.clpi" clpi file, and B in FIG. 34 is a diagram showing an example of a "00002.clpi" clpi file. With either clpi file, descriptions of an EP_map and chunk_map ( ) are included.

Figure 35:
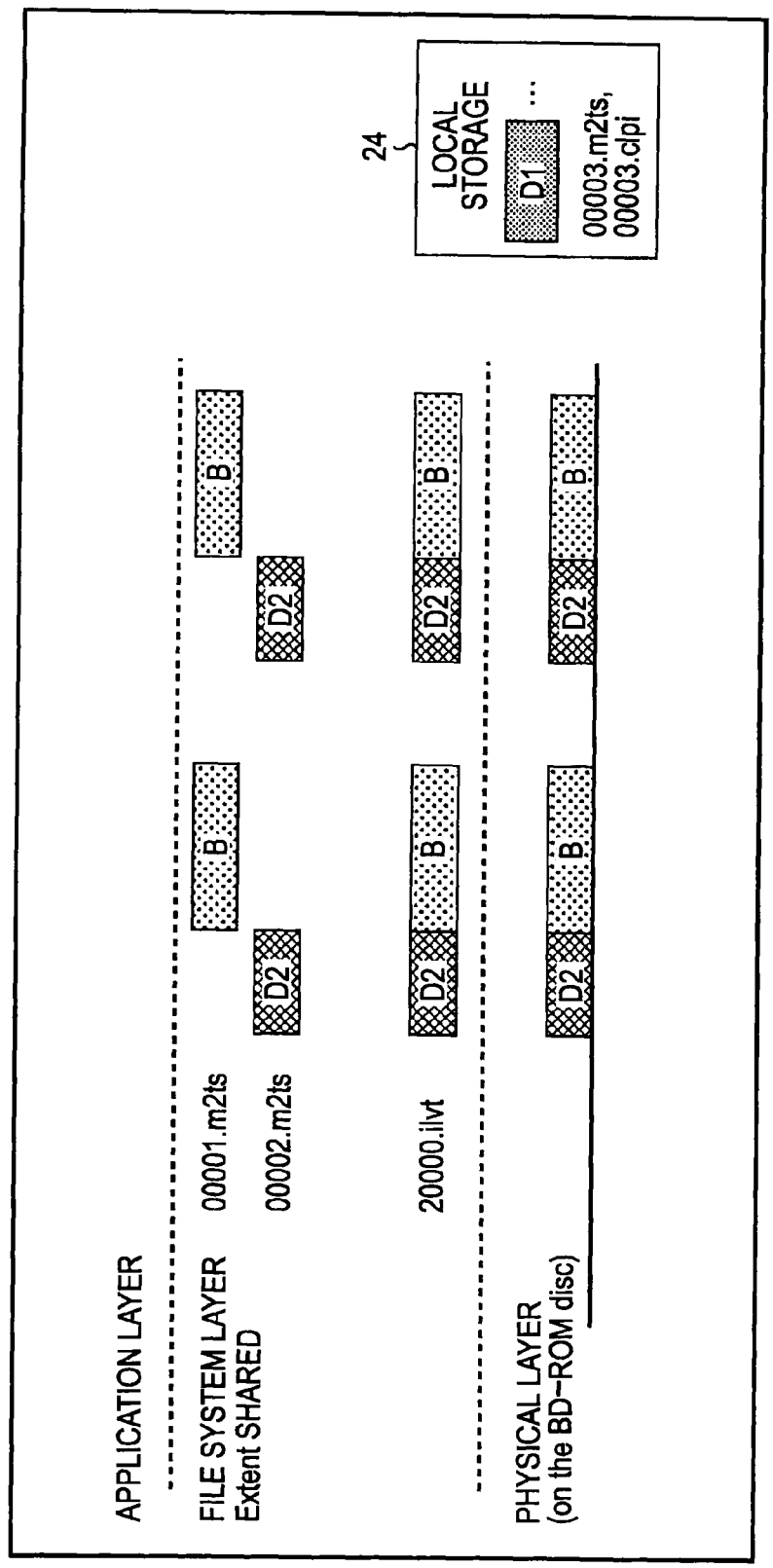
FIG. 35 is a diagram illustrating the concept of file management that is performed using the data in FIG. 33 and FIG. 34.

FIG. 35 is a diagram showing a concept of file managing performed using the data in FIG. 33 and FIG. 34.

As shown in FIG. 35, the physical layer is the layer of the optical disc 202 wherein the Base view video and D2 view video are recorded in an interleaved state and the local storage 254 wherein a D1 view video file that the second SubPath references is recorded.

With the example in FIG. 35, the file name of the m2ts file storing the D1 view video is "00003.m2ts". Also, the file name of the clpi file corresponding to "00003.m2ts" is "00003.clpi".

The "00001.m2ts" m2ts file is made up of Base view video chunks arrayed on the optical disc 202.

Also, the "00002.m2ts" m2ts file is made up of D2 view video chunks arrayed on the optical disc 202.

The "20000.ilvt" ilvt file is made up of D2 view video chunks and Base view video chunks arrayed on the optical disc 202.

In the case that "00001.m2ts" is specified by the application and data readout is instructed in order to perform 2D playing, the Base view video chunk is read out in accordance with the managing by the file system.

In the case that "00001.m2ts" is specified by the application and data readout is instructed in order to perform B-D1 playing, the Base view video chunk is read out in accordance with the managing by the file system. Also, a D1 view video m2ts file is read out from the local storage 254, specifying "00003.m2ts" in accordance with the description of the second SubPath of the 3D_PlayList in FIG. 33.

In the case that "20000.ilvt" is specified by the application and data readout is instructed in order to perform B-D2 playing, the D2 view video chunk and Base view video chunk are read out in accordance with the managing by the file system.

Operating Example 3

Figure 36:
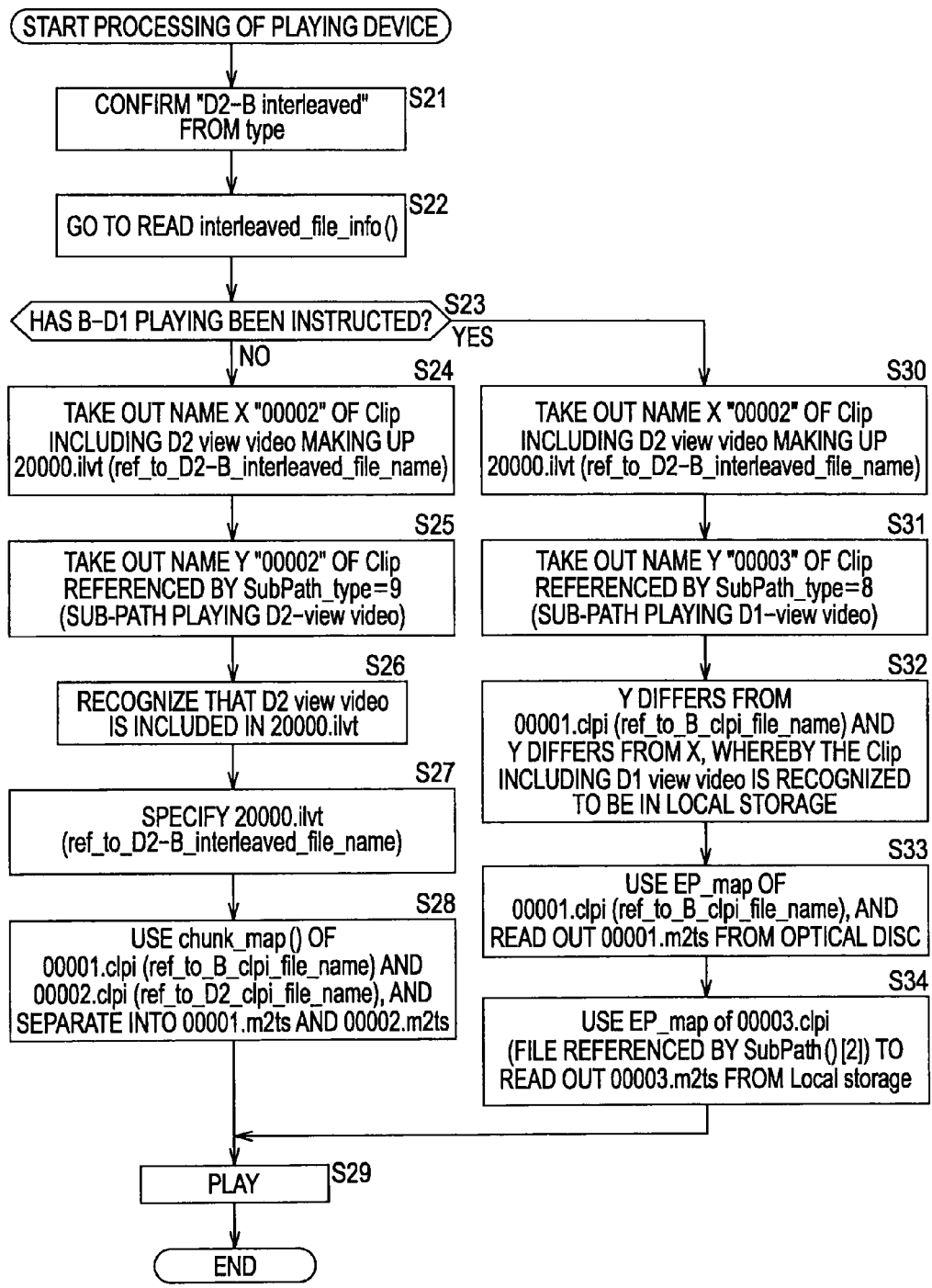
FIG. 36 is a flowchart describing playing processing that is performed according to the 3D_PlayList file in FIG. 33.

Playing processing that is performed in accordance with the 3D_PlayList file in FIG. 33 will be described with reference to the flowchart in FIG. 36.

In step S21 the controller 251 confirms from the value of the type that Base view video and D2 view video are interleaved.

In this case, in step S22 the controller 251 goes to read the interleaved_file_info ( ).

In step S23 the controller 251 determines whether or not B-D1 playing has been instructed.

In the case of performing B-D1 playing, data recorded on the optical disc 202 and data recorded on the local storage 254 is employed. On the other hand, in the case of performing B-D2 playing, data recorded on the optical disc 202 is used.

In the case that determination is made in step S23 that B-D1 playing has not been instructed, i.e., that B-D2 playing has been instructed, in step S24 the controller 251 takes out the Clip name X "00002" (excluding the portion of the extension of the m2ts file name including D2 view video) including the D2 view video making up "20000.ilvt" (ref_to_D2-B_interleaved_file_name) described in the interleaved_file_info ( ).

In step S25 the controller 251 takes out the Clip name Y "00002" referencing the subPath_type=9 (sub path playing the D2-view video).

In step S26 the controller 251 recognizes that the D2 view video is included in "20000.ilvt" since Y is the same as X. When Y is different from X here, the Clip including the D2 view video is on the local storage 254.

In step S27 the controller 251 specifies the "20000.ilvt" (ref_to_D2-B_interleaved_file_name) described in the interleaved_file_info ( ), and causes the Base view video chunks and D2 view video chunks to be read from the optical disc 202 through the UDF file system.

The base view video chunks and D2 view video chunks read out by the disk drive 252 are supplied to the separating unit 281 of the decoder unit 256.

In step S28, the separating unit 281 separates the supplied data into "00001.m2ts" m2ts file data and "00002.m2ts" m2ts file data, based on the chunk_map ( ) of the "00001.clpi" (ref_to_B_clpi_file_name) and the chunk_map ( ) of the "00002.clpi" (ref_to_D2_clpi_file_name). The separating unit 281 outputs the "00001.m2ts" m2ts file data to the read buffer 282, and outputs the "00002.m2ts" m2ts file data to the read buffer 285.

The "00001.m2ts" m2ts file data stored in the read buffer 282 is supplied to the decoder 290, via the PID filter 283, ES buffer 284, and switch 289. On the other hand, the data of the "00002.m2ts" m2ts file stored in the read buffer 285 is supplied to the decoder 290 via the PID filter 286, switch 287, ES buffer 288, and switch 289.

In step S29, the decoder 290 decodes the packets supplied sequentially from the switch 289.

On the other hand, in the case that determination is made in step S23 that B-D1 playing has been instructed, in step S30 the controller 251 takes out the Clip name X "00002" including the D2 view video making up "20000.ilvt" (ref_to_D2-B_interleaved_file_name) described in the interleaved_file_info ( ).

In step S31 the controller 251 takes out the Clip name Y "00003" referencing the subPath_type=8 (sub path playing the D1-view video).

In step S32 the controller 251 recognizes that Y differs from the portion excluding the extension of the "00001.clpi" (ref_to_B_clpi_file_name) and that Y differs from X, whereby the D1 view video Clip is on the local storage 254. Now, when Y is the same as the portion excluding the extension of the "00001.clpi", or when Y is the same as X, the D1 view video is included in "20000.ilvt".

In step S33 the controller 251 uses the EP_map of the "00001.clpi" (ref_to_B_clpi_file_name) and causes the disk drive 252 to read out the "00001.m2ts" m2ts file. The EP_map of "00001.clpi" includes information of an entry point serving as a decoding starting position of the "00001.m2ts" m2ts file.

In step S34 the controller 251 uses the EP_map of "00003.clpi" (referenced by SubPath ( ) [2]) to read out "00003.m2ts" m2ts file from the local storage 254. The EP_map of "00003.clpi" includes information of an entry point serving as a decoding starting position of the "00003.m2ts" m2ts file.

The read out Base view video chunks and D1 view video chunks are supplied to the separating unit 281 of the decoder unit 256.

After being stored in the read buffer 282, the data of the "00001.m2ts" m2ts file read out from the optical disc 202 is supplied to the decoder 290 via the PID filter 283, ES buffer 284, and switch 289.

Also, after being stored in the read buffer 285, the data of the "00003.m2ts" m2ts file read out from the local storage 254 is supplied to the decoder 290 via the PID filter 286, switch 287, ES buffer 288, and switch 289.

In step S29 the decoder 290 decodes the packets supplied sequentially from the switch 289.

[Method of Random Access Playing of "10000.ilvt" Using Chunk_Map ( )]

FIG. 37 is a diagram showing the summarized content of the chunk_map ( ) described with reference to FIG. 27.

When the SPN_chunk_start described in the chunk_map ( ) of each clpi file (the SPN (length) from the base position) is arrayed taking i in the vertical direction, this is as shown in FIG. 37.

FIG. 38 is a diagram showing the syntax of the EP_map ( ) described in each clpi file along with the chunk_map ( ).

The EP_map ( ) is referenced in order to identify the decoding start position when performing random access or the like.

number_of_EP_entries indicates the number of EPs (entry points).

Description after the number_of_EP_entries is prepared for each EP. PTS_EP_start [i] indicates the PTS of the EP, and SPN_EP_start [i] indicates the SPN of the EP. Thus, PTS and SPN for each entry point are correlated and registered to the EP_map.

Figure 39:
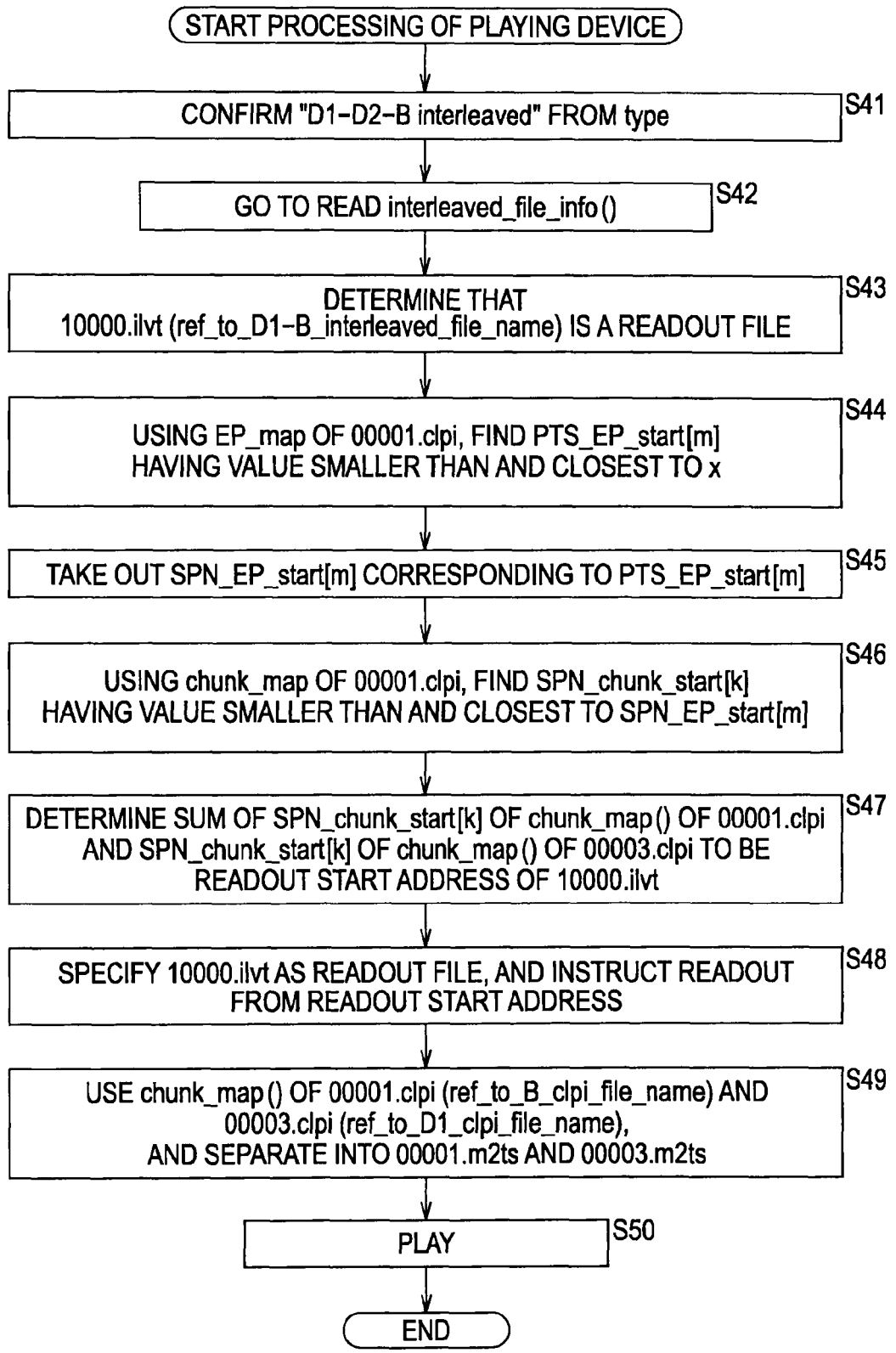
FIG. 39 is a flowchart describing a random access processing of the playing device.

Description for the processing of the playing device 201 will be described with reference to the flowchart in FIG. 39.

Description will be given now for the case wherein the 3D_PlayList of FIG. 22 is referenced to perform B-D1 playing, and random access is performed.

In step S41 the controller 251 confirms from the value of the type that the Base view video, D1 view video, and D2 view video are all interleaved.

In this case, in step S42 the controller 251 goes to read the interleaved_file_info ( ).

In step S43 the controller 251 determines that the "10000.ilvt" (ref_to_D1-B_interleaved_file_name) described in interleaved_file_info ( ) is a readout file.

In the case of starting playing from the point-in-time x of the "00000.mpls" 3D_PlayList, in step S44 the controller 251 uses the EP_map of the "00001.clpi" (ref_to_B_clpi_file_name) to find the PTS_EP_start [m] having a value that is smaller than and nearest x.

In step S45 the controller 251 takes out the SPN_EP_start [m] that corresponds to PTS_EP_start [m]. As described with reference to FIG. 38, PTS_EP_start [i] and SPN_EP_start [i] are correlated and registered to the EP_map.

Figure 40:
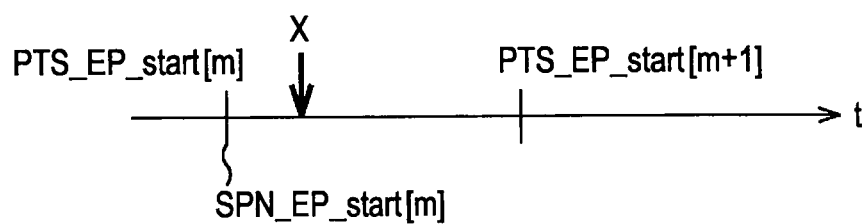
FIG. 40 is a diagram illustrating an example of positions specified by the processing in steps S44 and S45.

FIG. 40 is a diagram showing an example of the position specified by the processing in steps S44 and S45.

As shown in FIG. 40, in the case of starting playing from the point-in-time x on the temporal axis, a PTS_EP_start [m] having a value smaller than and nearest x is identified in step S44. Also, a SPN_EP_start [m] corresponding to PTS_EP_start [m] is identified in step S45.

Figure 41:
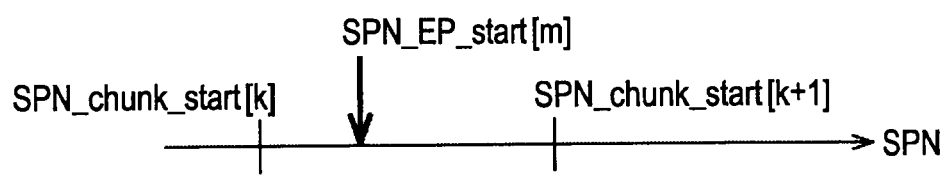
FIG. 41 is a diagram illustrating SPN_chunk_start [k] that is identified by the processing in step S46.

In step S46 the controller 251 uses the chunk_map of "00001.clpi" and finds an SPN_chunk_start [k] having a value smaller than and nearest SPN_EP_start [m]. The SPN_chunk_start [k] identified by the processing in step S46 is shown in FIG. 41.

In step S47 the controller 251 determines the sum of the SPN_chunk_start [k] of the chunk_map ( ) of "00001.clpi" and the SPN_chunk_start [k] of the chunk_map ( ) of "00003.clpi" (ref_to_D1_clpi_file_name) as the readout start address of "10000.ilvt".

The readout start address of "10000.ilvt" determined here shows the starting address of a D1 [k] chunk in the "10000.ilvt".

In step S48 the controller 251 specifies the "10000.ilvt (ref_to_D1-B_interleaved_file_name), and causes Base view video chunks and D1 view video chunks to be read out from the address determined in step S47, through the UDF file system.

The Base view video chunks and D1 view video chunks that have been read out are supplied to the separating unit 281 of the decoder unit 256.

In step S49 the separating unit 281 separates the supplied data into "00001.m2ts" m2ts file data and "00003.m2ts" m2ts file data, based on the chunk_map ( ) of the "00001.clpi" (ref_to_B_clpi_file_name) and the chunk_map ( ) of the "00003.clpi" (ref_to_D1_clpi_file_name). The separating unit 281 outputs the "00001.m2ts" m2ts file data to the read buffer 282, and outputs the "00003.m2ts" m2ts file data to the read buffer 285.

The "00001.m2ts" m2ts file data stored in the read buffer 282 is supplied to the decoder 290 via the PID filter 283, ES buffer 284, and switch 289. The "00003.m2ts" m2ts file data stored in the read buffer 285 is supplied to the decoder 290 via the PID filter 286, switch 287, ES buffer 288, and switch 289.

In step S50, the decoder 290 decodes packets that are sequentially supplied from the switch 289.

Random access of an ilvt file is performed as described above.

[Regarding Ep_Map]

Now, EP_map will be described.

The EP_map of the Base view video will be described, but an EP_map is set similarly for the D1/D2 view videos. For example, in the case that an entry point is set in a certain picture of the Base view video, an entry point is also set in the corresponding picture of the D1/D2 view video.

The Base view video picture and D1/D2 view video picture that are in the same position when arraying the picture of each stream in encoding order/decoding error or display order is the corresponding picture.

Figure 42:
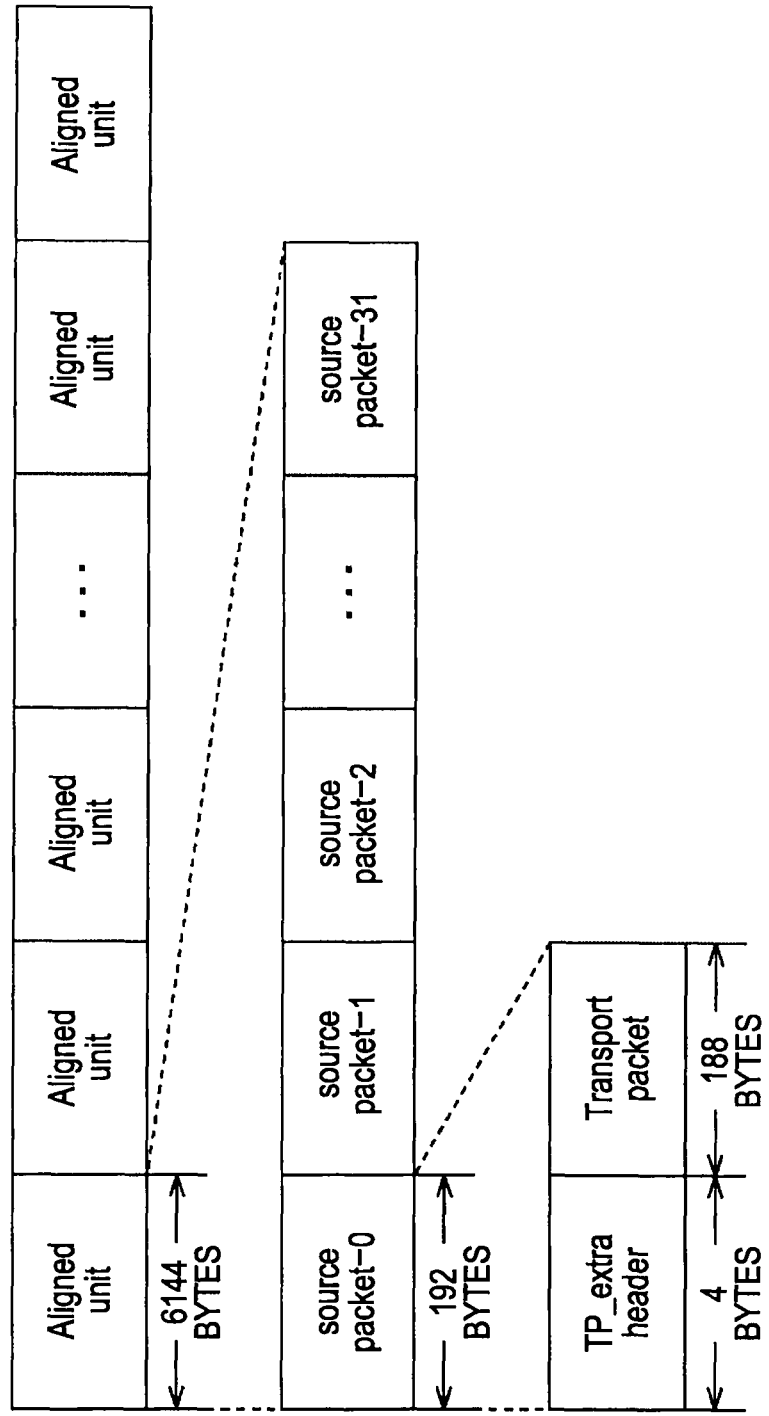
FIG. 42 is a diagram illustrating a configuration of an AV stream recorded on an optical disc.

FIG. 42 is a diagram showing the configuration of an AV stream recorded on the optical disc 202.

The TS including the Base view video stream is made up of an integer number of Aligned Unit having a size of 6144 bytes.

The Aligned Unit is made up of 32 Source Packets. A source packet has 192 bytes. One source packet is made up of a 4-byte transport packet extra header (TP_extra header) and a 188-byte Transport Packet.

The data of the Base view video is packetized into an MPEG2 PES packet. The PES packet is formed by the PES packet header being appended to the data portion of the PES packet. Stream IDs identifying the type of elementary stream that the PES packet transmits is included in the PES packet header.

The PES packet is further packetized into a transport packet. That is to say, the PES packet is divided into transport packet payload sizes, a transport packet header is appended to the payload, and the transport packet is formed. The transport packet header includes a PID which is identifying information of the data stored in the payload.

Note that the source packet is provided with a source packet number which increases one at a time for each source packet, with the head of the Clip AV stream as 0, for example. Also, the aligned unit starts from the first byte of the source packet.

When a time stamp of an access point of the Clip is provided, the EP_map is used in order to search for the data address that is to read out and start the data within the clip AV stream file. The EP_map is a list of entry points extracted from the elementary stream and transport stream.

The EP_map has address information in order to search for an entry point that is to start the decoding within the AV stream. One piece of EP data within the EP_map is made up of a pair of a PTS and the address within the AV stream of the Access Unite corresponding to the PTS. With AVC/H.264, one picture worth of data is stored in one Access Unite.

Figure 43:
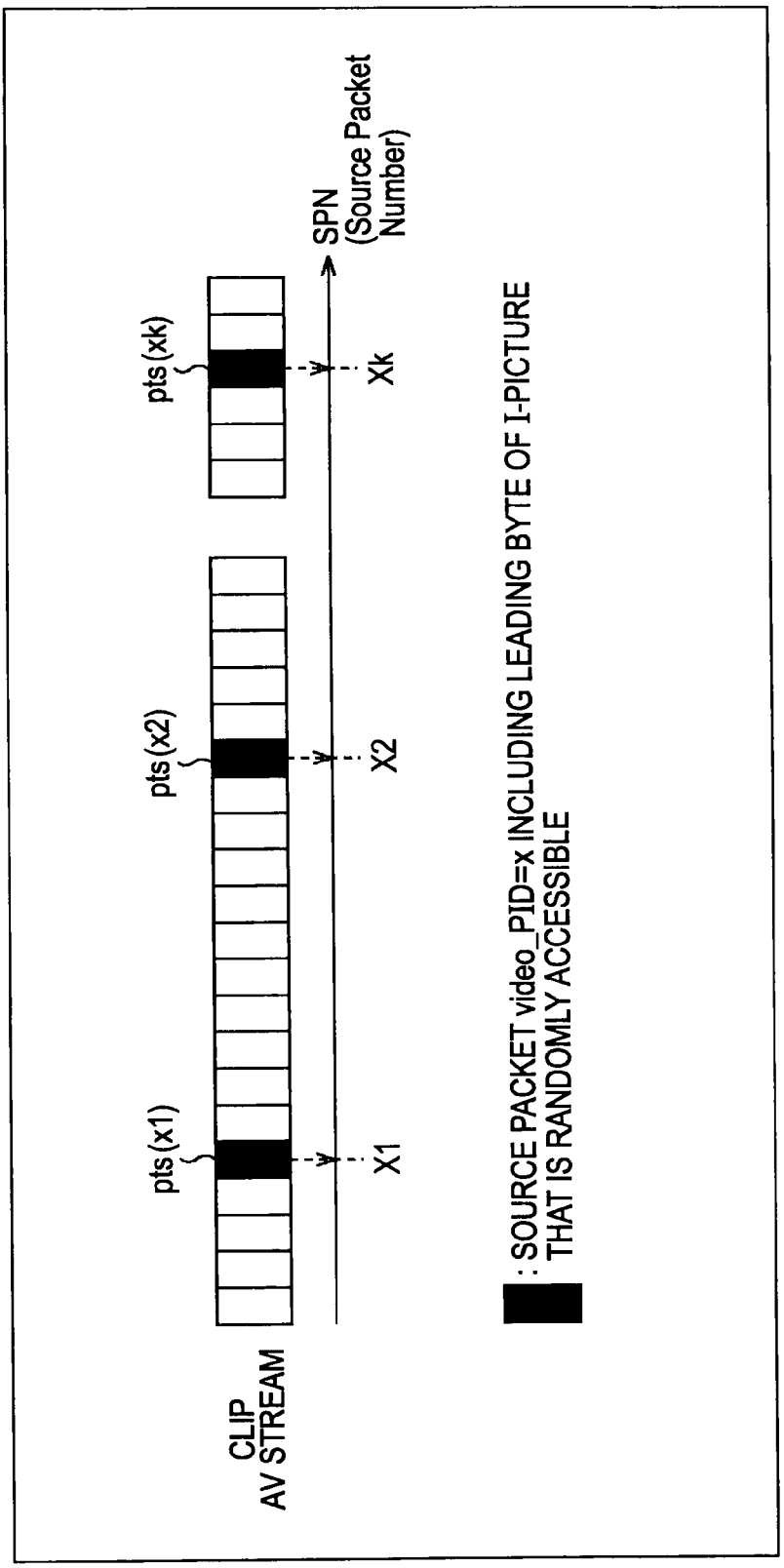
FIG. 43 is a diagram illustrating an example of a Clip AV stream.

FIG. 43 is a diagram showing an example of the Clip AV stream.

The Clip AV stream in FIG. 43 is a video stream (Base view video stream) made up of source packets identified by PID=x. The video stream is distinguished by the PID included in the transport packet header within the source packet for each source packet.

In FIG. 43, color is attached to the source packet including the leading byte of the IDR (instantaneous Decordign Refresh) picture within the source packets of the video stream. The quadrangle with no color indicates source packets including data that will not be random access points and source packets including data of other streams.

An IDR picture is an I-picture, and is decoded first within a GOP that includes an IDR picture. At the time of decoding the IDR picture, all of the information relating to decoding such as the state of the reference picture buffer, frame numbers and POC (Picture Order Count) managed up to then is reset.

For example, a source packet with the source packet number X1, which includes the head byte of an IDR picture that can be randomly accessed by the video stream which is distinguished by PID=x, is arrayed at the position of PTS=pts (x1) on the temporal axis of the clip AV stream.

Similarly, a source packet including the head byte of the IDR picture that can be randomly accessed is the source packet of a source packet number X2, and is disposed at the position of PTS=pts (x2).

Figure 44:
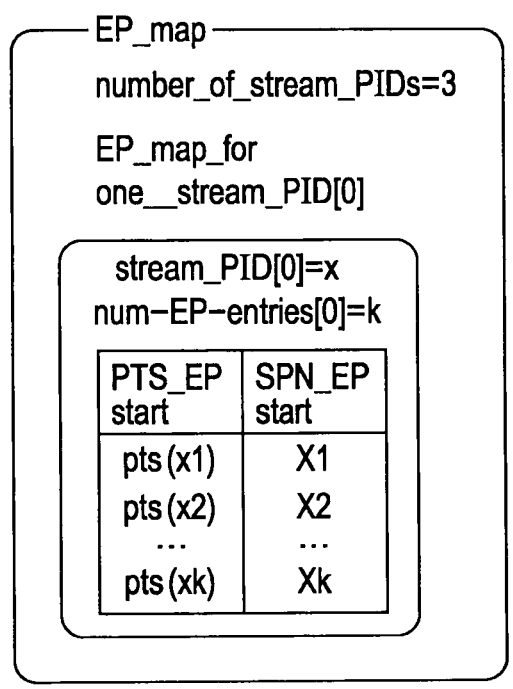
FIG. 44 is a diagram illustrating an example of an EP_map.

FIG. 44 is a diagram conceptually showing an example of the EP_map corresponding to the Clip AV stream in FIG. 43.

As shown in FIG. 44, the EP_map is made up of a stream_PID, PTS_EP_start, and SPN_EP_start.

The stream_PID indicates the PID of the transport packet that transfers the video stream.

The PTS_EP_start indicates the PTS of the Access Unite beginning from the IDR picture that can be randomly accessed.

The SPN_EP_start indicates the address of the source packet including the first byte of the Access Unite to be referenced by the value of the PT_SEP_start.

The PID of the video stream is stored in the stream_PID, and an EP_map_for_one_stream_PID ( ), which is table information showing corresponding relation of the PTS_EP_start and SPN_EP_start, is generated.

For example, a PTS=pts (x1) and source packet number X1, PTS=pts (x2) and source packet number X2, . . . , and PTS=pts (xk) and source packet number Xk are described in the EP_map_for_one_stream_PID (0) of the PID=x video stream in a respectively corresponding manner.

Such a table is also generated for each of the video streams multiplexed in the same Clip AV stream. The EP_map including the generated table is stored in a Clip Information file corresponding to this Clip AV stream.

Figure 45:
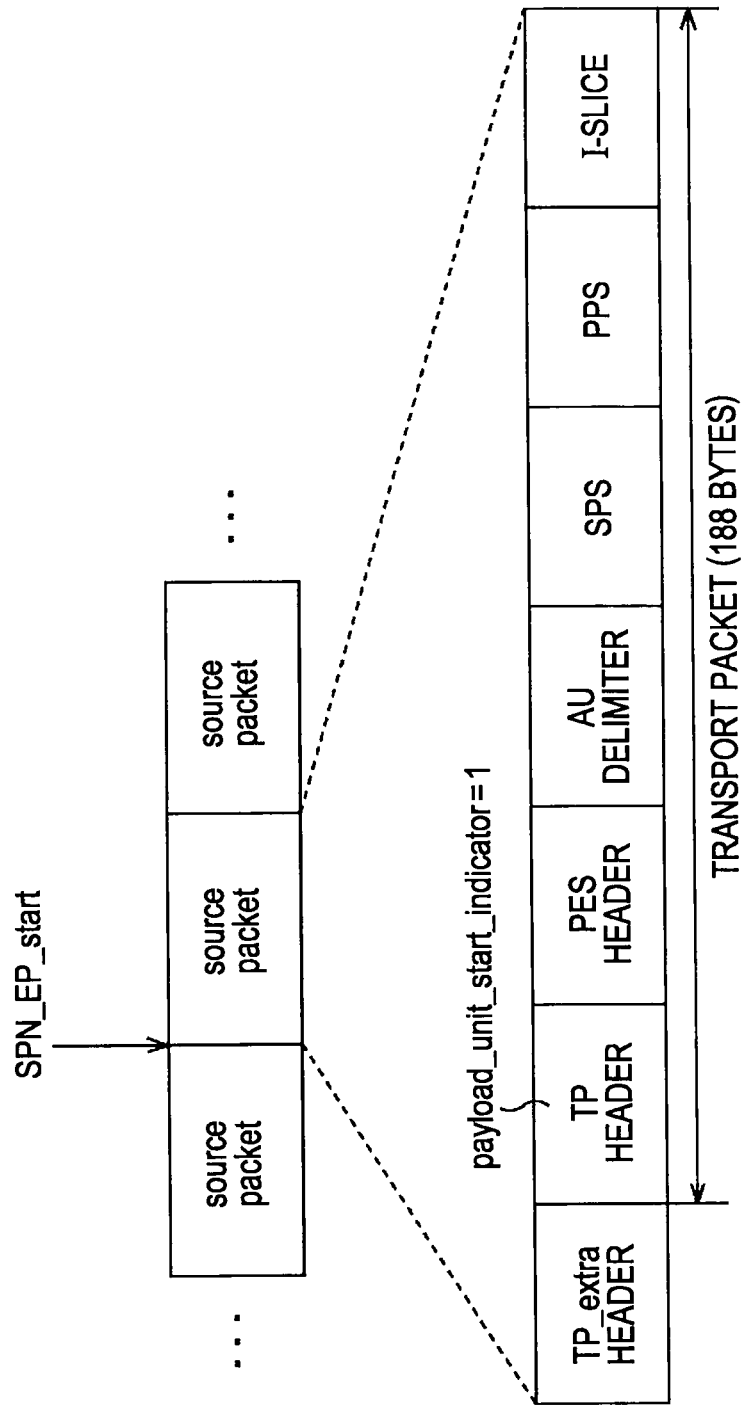
FIG. 45 is a diagram illustrating an example of data configuration of a source packet indicated by SPN_EP_start.

FIG. 45 is a diagram showing an example of data configuration of a source packet that the SPN_EP_start indicates.

As described above, the source packet is configured in a form wherein a 4-byte header is appended to a 188-byte transport packet. The transport packet portion is made up of a header portion (TP header) and payload portion. The SPN_EP_start indicates a source packet number of the source packet that includes the first byte of the Access unite which begins from the IDR picture.

With AVC/H.264, the Access Unite, i.e., the picture, is started from an AU delimiter (Access Unit Delimiter). After the AU delimiter, an SRS and PPS follow. Subsequently, the leading portion or entirety of the data of a slice of IDR picture is stored.

The fact that the value of the payload_unit_start_indicator in the TP header of the transport packet is 1 indicates that a new PES packet begins from the payload of the transport packet herein. Access Unite is to be started from the source packet herein.

Such an EP_map is prepared for each of the Base view video stream and Dependent view video stream.

[Configuration Example of Recording Device]

Figure 46:
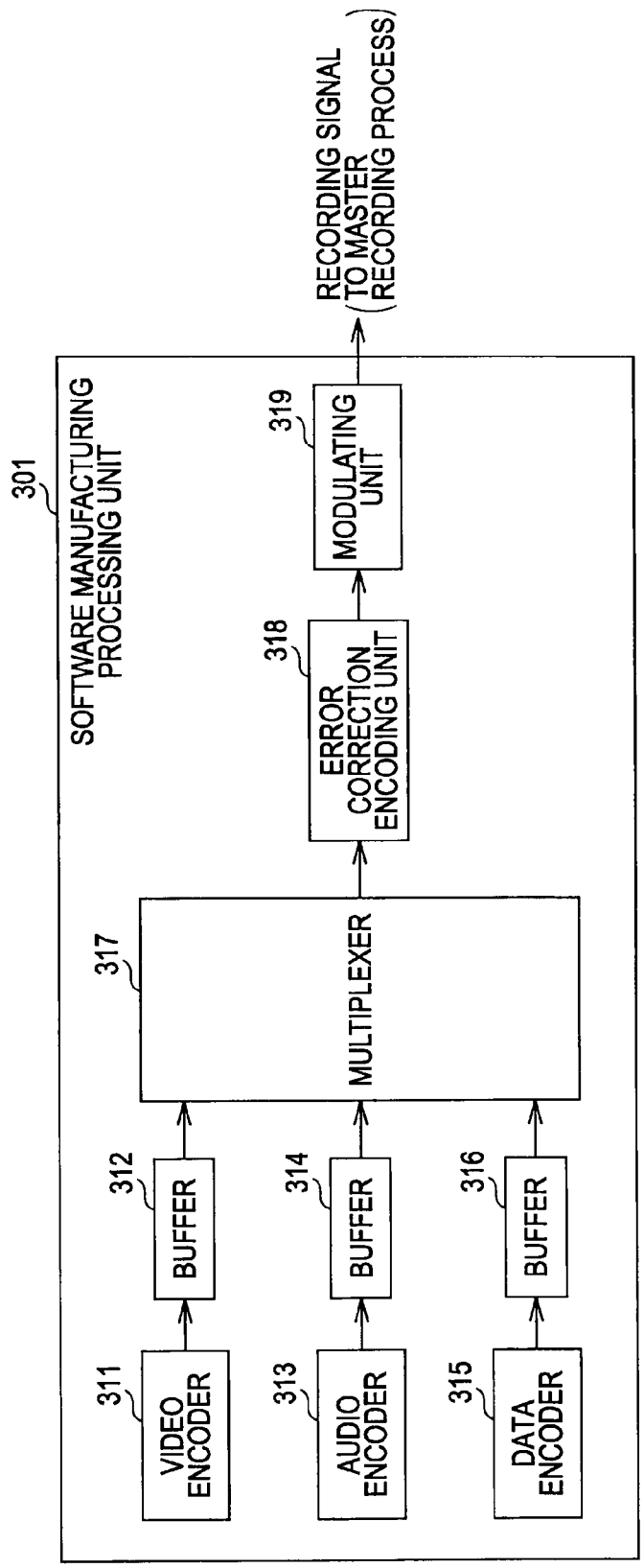
FIG. 46 is a block diagram illustrating a configuration example of a software fabrication processing unit.

FIG. 46 is a block diagram showing a configuration example of the software fabrication processing unit 301.

A video encoder 311 has a similar configuration as the MVC encoder 211 in FIG. 3. The video encoder 311 generates a Base view video stream and Dependent view video stream by encoding multiple pieces of video data with the H.264 AVC/MVC, and outputs this to the buffer 312.

An audio encoder 313 encodes the input audio stream and outputs the obtained data to a buffer 314. An audio stream to record onto a disk is input to the audio encoder 313, along with the Base view video and Dependent view video streams.

A data encoder 315 encodes various types of data described above other than video and audio, such as PlayList files, and outputs the data obtained by encoding to a buffer 316.

For example, the data encoder 315 sets the type (FIG. 18) in the PlayList file to indicate whether or not the Base view video stream data and the D1/D2 view video stream data are recorded on the optical disc in the state of being interleaved in increments of extents.

Also, in the case that the Base view video stream data and the D1/D2 view video stream data are recorded on the optical disc in the state of being interleaved, the data encoder 315 set the above-described ilvt file as the PlayList file. The ilvt file functions as a virtual file that virtually summarizes and manages the Base view video stream data and the D1/D2 view video stream data.

Further, the data encoder 315 sets the file name of the Clip Information file for each Clip in the PlayList, and sets an EP_map and chunk_map in each of the Clip Information files.

A multiplexing unit 317 multiplexes the video data and audio data stored in each of the buffers, and data other than streams along with a synchronizing signal, and outputs this to an error correction encoding unit 318.

The error correction encoding unit 318 appends error correction code to the data multiplexed by the multiplexing unit 317.

A modulation unit 319 subjects the data supplied from the error correction encoding unit 318 to modulation, and outputs this. The output of the modulating unit 319 is software to be recorded in the optical disc 202 that can be played on the playing device 201.

A software fabrication processing unit 301 having such a configuration is provided to the recording device.

Figure 47:
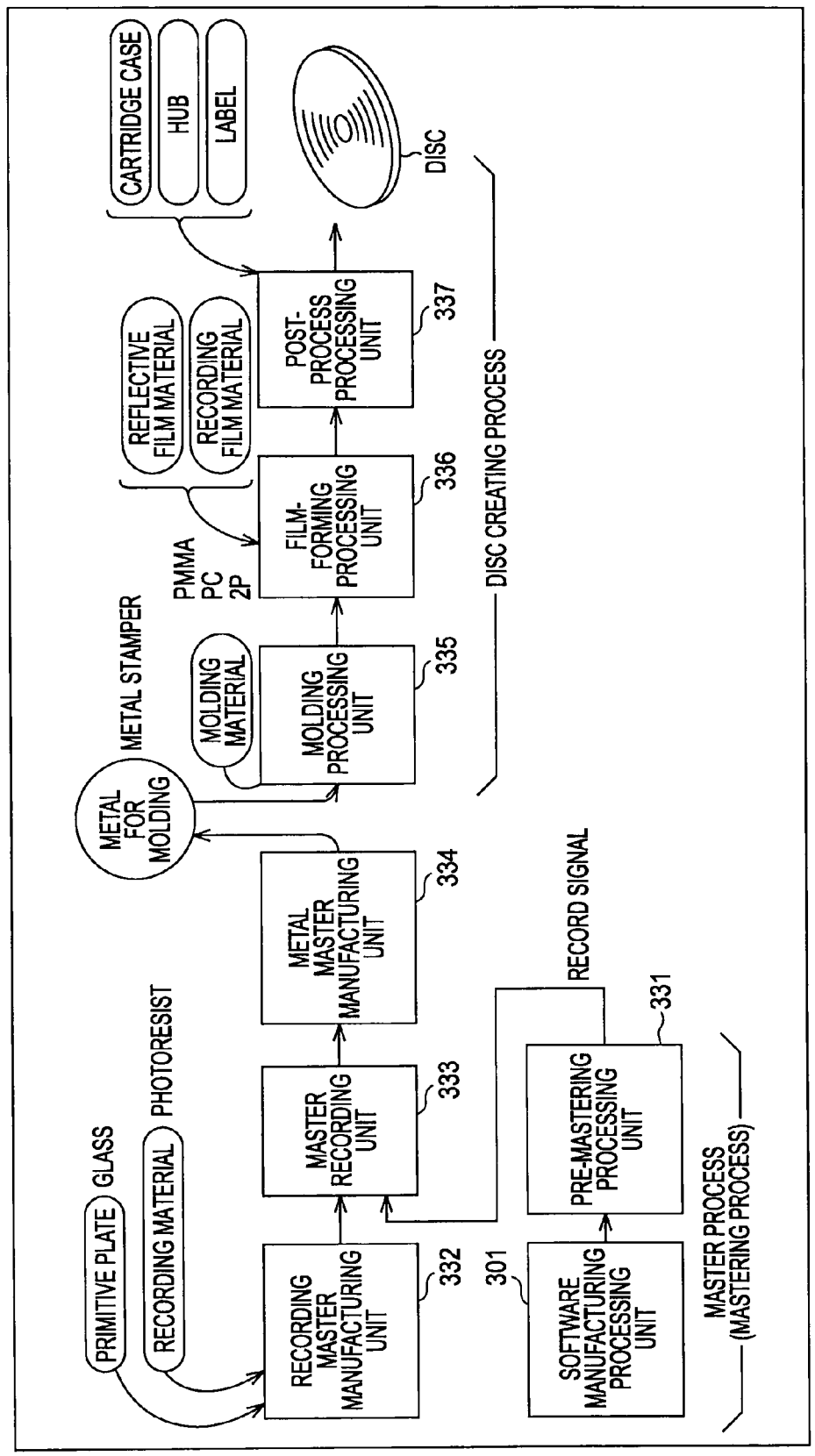
FIG. 47 is a diagram illustrating an example of a configuration including a software fabrication processing unit.

FIG. 47 is a diagram showing an example of a configuration including the software fabrication processing unit 301.

A portion of the configuration shown in FIG. 47 may also be provided within the recording device.

The recording signal generated by the software fabrication processing unit 301 is subjected to mastering processing with a pre-mastering processing unit 331, and a signal in a format to be recorded on the optical disc 202 is generated. The generated signal is supplied to a master recording unit 333.

With a recording master manufacturing unit 332, a master made of glass or the like is prepared, and a recording material made up of a photoresist or the like is coated thereon. Thus, a recording master is manufactured.

With the master recording unit 333, a laser beam is modulated corresponding to the recording signal supplied from the pre-mastering processing unit 331, and irradiated onto the photoresist of the master. Thus, the photoresist on the master is exposed corresponding to the recording signal. Subsequently, the master is developed, and pits are caused to appear on the master.

With a metallic master manufacturing unit 334, processing such as electroforming is performed as to the master, and a metallic master to which pits on a glass plate have been transferred is manufactured. From the metallic master herein, a metallic stamper is further manufactured, and this is taken as a molding die.

With a molding processing unit 335, material such as PMMA (acrylic) or PC (polycarbonate) is injected by injection or the like to the molding die, and solidifying is performed. Alternatively, after coating the metallic stamper with a 2P (ultraviolet hardening resin) or the like, irradiating ultraviolet light and hardening is performed. Thus, the pits on the metallic stamper can be transferred to a replica made of a resin.

With a film-forming processing unit 336, a reflection film is formed on the replica by evaporation or sputtering. Alternatively also a reflection film is formed on the replica by spin coating.

With a post-process processing unit 337, processing of inner and outer diameters is performed as to the disk, and necessary treatment is performed such as pasting together two disks. Further, after attaching a label or attaching a hub, this is inserted into a cartridge. Thus an optical disc 202 wherein data playable by the playing device 201 is recorded is completed.

The above-described series of processing can be executed with hardware, and can be executed with software. In the case of executing the series of processing with software, programs comprising the software thereof are installed in a computer that is built into dedicated hardware or a general-use personal computer.

The program to be installed is recorded on a removable recording medium and provided. Also, this can be provided via cable or wireless transfer media such as a Local Area Network, the Internet, or digital broadcasts.

The embodiments of the present invention are not to be limited to the above-described embodiments, and various modifications can be made without departing from the essence of the present invention.

REFERENCE SIGNS LIST 201 playing device
202 optical disc
203 display device
211 MVC encoder
221 H.264/AVC encoder
222 H.264/AVC decoder
223 Depth computing unit
224 Dependent view video encoder
225 multiplexer
251 controller
252 disk drive
253 memory
254 local storage
255 internet interface
256 decoding unit
257 operation input unit

The invention claimed is:

1. A playing device comprising:
readout means which read out, from a recording medium, an interleaved file, which is a file in which are interleaved, in chunk increments of a predetermined data amount, a first multiplexed stream including, out of a basic stream generated by a video stream having been encoded with a predetermined encoding method and an expanded stream, the basic stream, and a second multiplexed stream including said expanded stream corresponding to said basic stream, read out a first information file which is information of said first multiplexed stream and which has the number of chunks making up said multiplexed stream and a starting packet number within said first multiplexed stream for each chunk, and read out a second information file which is information of said second multiplexed stream and which has the number of chunks making up said second multiplexed stream and a starting packet number within said second multiplexed stream for each chunk; and
separating means to separate said interleaved file into said first multiplexed stream and said second multiplexed stream, using said first information file and said second information file,
wherein said chunk is a collection of source packets continuously arrayed on said recording medium,
wherein the number of said chunks that said first information file has and the number of said chunks that said second information file has are the same number,
wherein
said first information file further has information of the total number of source packets making up said first multiplexed stream, and
said second information file further has information of the total number of source packets making up said second multiplexed stream, and
wherein
when the number of said chunks that said first information file has is expressed as (n+1), the chunks making up said first multiplexed stream as B[i] (i=0 through n), and the k'th chunk from the head of said first multiplexed stream as B[k],
the chunks making up said second multiplexed stream is expressed as D[i] (i=0 through n), and the k'th chunk from the head of said second multiplexed stream as D[k], the starting packet number of B[k] is expressed as SPN_chunk_start_1[k], the starting packet number of D[k] is expressed as SPN_chunk_start_2[k], the total number of source packets making up said first multiplexed stream is expressed as number_of_source_packets1, and the total number of source packets making up said second multiplexed stream is expressed as number_of_source_packets2, said separating means calculate the number of source packets making up B[k] by (SPN_chunk_start_1[k+1]−SPN_chunk_start_1[k]), where k=0 through (n−1), calculate the number of source packets making up D[k] by (SPN_chunk_start_2[k+1]−SPN_chunk_start_2[k]), where k=0 through (n−1), calculate the number of source packets making up B[n] by (number_of_source_packets1−SPN_chunk_start_1[n]), and calculate the number of source packets making up D[n] by (number_of_source_packets2−SPN_chunk_start_2[n]).

2. The playing device according to claim 1, a set of chunks having the same value of i have the same playing time regarding B[i] and D[i].

3. The playing device according to claim 1, further comprising:

control means to control readout by said readout means, wherein said control means read out an EP_map which is information of said first multiplexed stream and information having the number of entry points within said first multiplexed stream, a PTS_EP_start[i] indicating a PTS (presentation Time Stamp), and an SPN_EP_start[i] which is a source packet number showing a position for each entry point;

detect a PTS_EP_start[m] having a value smaller than and nearest a specified playing start point-in-time;

detect an SPN_EP_start[m] corresponding to the PTS_EP_ start[m];

detect an SPN_chunk_start_1[k] having a value smaller than and nearest SPN_EP_start[m], and k thereof; and determine the sum of SPN_chunk_start_1[k] and SPN_chunk_start_2[k] as a readout starting address of said interleaved file.

4. The playing device according to claim 1, wherein said basic stream and said expanded stream are the Base view video stream and Dependent view video stream, respectively, that are generated by the video streams being encoded by H.264 AVC/MVC.

5. A playing method includes the steps of:

reading out from a recording medium an interleaved file which is a file in which are interleaved in chunk increments of a predetermined data amount with a first multiplexed stream including out of a basic stream generated by a video stream having been encoded with a predetermined encoding method, the basic stream, and an expanded stream and a second multiplexed stream including said expanded stream corresponding to said basic stream;

reading out a first information file which is information of said first multiplexed stream and which has the number of chunks making up said multiplexed stream and a starting packet number within said first multiplexed stream for each chunk, and reading out a second information file which is information of said second multiplexed stream and which has the number of chunks making up said second multiplexed stream and a starting packet number within said second multiplexed stream for each chunk; and separating said interleaved file into said first multiplexed stream and said second multiplexed stream, using said first information file and said second information file, wherein said chunk is a collection of source packets continuously arrayed on said recording medium, wherein the number of said chunks that said first information file has and the number of said chunks that said second information file has are the same number, wherein said first information file further has information of the total number of source packets making up said first multiplexed stream, and said second information file further has information of the total number of source packets making up said second multiplexed stream, and wherein when the number of said chunks that said first information file has is expressed as (n+1), the chunks making up said first multiplexed stream as B[i] (i=0 through n), and the k'th chunk from the head of said first multiplexed stream as B[k], the chunks making up said second multiplexed stream is expressed as D[i] (i=0 through n), and the k'th chunk from the head of said second multiplexed stream as D[k], the starting packet number of B[k] is expressed as SPN_chunk_start_1[k], the starting packet number of D[k] is expressed as SPN_chunk_start_2[k], the total number of source packets making up said first multiplexed stream is expressed as number_of_source_packets1, and the total number of source packets making up said second multiplexed stream is expressed as number_of_source_packets2, said separating means calculate the number of source packets making up B[k] by (SPN_chunk_start_1[k+1]−SPN_chunk_start_1[k]), where k=0 through (n −1), calculate the number of source packets making up D[k] by (SPN_chunk_start_2[k+1]−SPN_chunk_start_2[k]), where k=0 through (n−1), calculate the number of source packets making up B[n] by (number_of_source_packets1−SPN_chunk_start_1[n]), and calculate the number of source packets making up D[n] by (number_of_source_packets2−SPN_chunk_start_2[n]).

6. A non-transitory computer readable medium having stored thereon a program that causes a computer to execute processing including the steps of:

reading out from a recording medium an interleaved file which is a file in which are interleaved in chunk increments of a predetermined data amount with a first multiplexed stream including out of a basic stream generated by a video stream having been encoded with a predetermined encoding method, the basic stream, and an expanded stream and a second multiplexed stream including said expanded stream corresponding to said basic stream;

reading out a first information file which is information of said first multiplexed stream and which has the number of chunks making up said multiplexed stream and a starting packet number within said first multiplexed stream for each chunk, and reading out a second information file which is information of said second multiplexed stream and which has the number of chunks making up said second multiplexed stream and a starting packet number within said second multiplexed stream for each chunk; and separating said interleaved file into said first multiplexed stream and said second multiplexed stream, using said first information file and said second information file, wherein said chunk is a collection of source packets continuously arrayed on said recording medium, wherein the number of said chunks that said first information file has and the number of said chunks that said second information file has are the same number, wherein said first information file further has information of the total number of source packets making up said first multiplexed stream, and said second information file further has information of the total number of source packets making up said second multiplexed stream, and wherein when the number of said chunks that said first information file has is expressed as (n+1), the chunks making up said first multiplexed stream as B[i] (i=0 through n), and the k'th chunk from the head of said first multiplexed stream as B[k], the chunks making up said second multiplexed stream is expressed as D[i] (i=0 through n), and the k'th chunk from the head of said second multiplexed stream as D[k], the starting packet number of B[k] is expressed as SPN_chunk_start_1[k], the starting packet number of D[k] is expressed as SPN_chunk_start_2[k], the total number of source packets making up said first multiplexed stream is expressed as number_of_source_packets1, and the total number of source packets making up said second multiplexed stream is expressed as number_of_source_packets2, said separating means calculate the number of source packets making up B[k] by (SPN_chunk_start_1[k+1]−SPN_chunk_start_1[k]), where k=0 through (n−1), calculate the number of source packets making up D[k] by (SPN_chunk_start_2[k+1]−SPN_chunk_start_2[k]), where k=0 through (n−1), calculate the number of source packets making up B[n] by (number_of_source_packets1−SPN_chunk_start_1[n]), and calculate the number of source packets making up D[n] by (number_of_source_packets2−SPN_chunk_start_2[n]).

\* \* \* \* \*